United States Patent [19]
Harrison et al.

[11] Patent Number: 5,748,254
[45] Date of Patent: May 5, 1998

[54] SYSTEMS WITH A REMOTE CONTROL IN WHICH INFORMATION CAN BE RETRIEVED FROM AN ENCODED, LASER READABLE DISC

[75] Inventors: Robert G. Harrison; Robert D. Lamson, both of Seattle, Wash.

[73] Assignee: Coach Master International Corporation, Seattle, Wash.

[21] Appl. No.: 569,310

[22] Filed: Dec. 8, 1995

Related U.S. Application Data

[62] Division of Ser. No. 505,969, Jul. 24, 1995.

[51] Int. Cl.$^6$ .................................................. H04N 7/00
[52] U.S. Cl. ...................... 348/552; 434/307 R; 348/553; 348/838
[58] Field of Search ..................... 348/61, 552, 553, 348/234, 836, 838, 839; 434/307 R

[56] References Cited

U.S. PATENT DOCUMENTS

| 4,745,397 | 5/1988 | Lagerbauer et al. | 348/734 |
|---|---|---|---|
| 4,768,230 | 8/1988 | Viebrantz et al. | 455/603 |
| 5,033,969 | 7/1991 | Kamimura | 434/307 R |
| 5,120,230 | 6/1992 | Clark et al. | 434/307 |
| 5,212,553 | 5/1993 | Maruoka | 358/188 |
| 5,253,066 | 10/1993 | Vogel | 358/188 |
| 5,371,553 | 12/1994 | Kawamura et al. | 343/734 |
| 5,396,546 | 3/1995 | Remillard | 379/96 |
| 5,438,372 | 8/1995 | Tsumori et al. | 348/365 |
| 5,471,254 | 11/1995 | Claassen | 348/734 |
| 5,475,835 | 12/1995 | Hickey | 348/552 |
| 5,488,427 | 1/1996 | Kayashima et al. | 348/569 |
| 5,495,459 | 2/1996 | Tsukimi | 369/48 |
| 5,499,221 | 3/1996 | Ito et al. | 348/553 |
| 5,513,997 | 5/1996 | Reynolds et al. | 348/61 |
| 5,515,052 | 5/1996 | Darbee | 341/176 |
| 5,539,479 | 7/1996 | Bertram | 348/564 |
| 5,592,234 | 1/1997 | Gardner et al. | 348/553 |

*Primary Examiner*—Victor R. Kostak
*Attorney, Agent, or Firm*—Hughes, Multer & Schacht

[57] ABSTRACT

Systems which have an integrated unit that allows both television signals and information retrieved from an onboard information storage device to be presented in visual, audio, or visual/audio form via output devices such as television screens and audio speakers. The operating mode—television or stored information retrieval and display—is selected by the user. The user is coached through steps leading to retrieval and presentation of the wanted information if the information retrieval mode is selected. A novel remote control allows the system user to choose the mode of operation and to navigate the steps needed to reach the wanted information from a location convenient to the user.

26 Claims, 16 Drawing Sheets

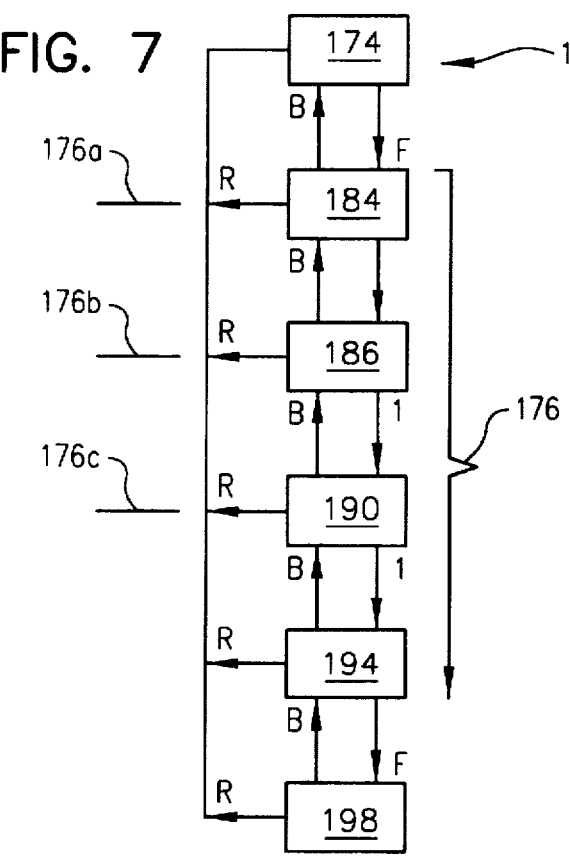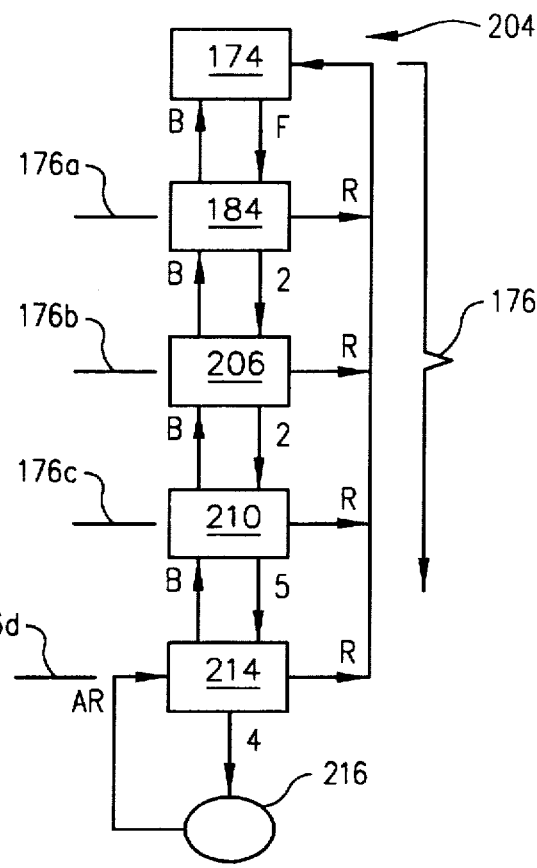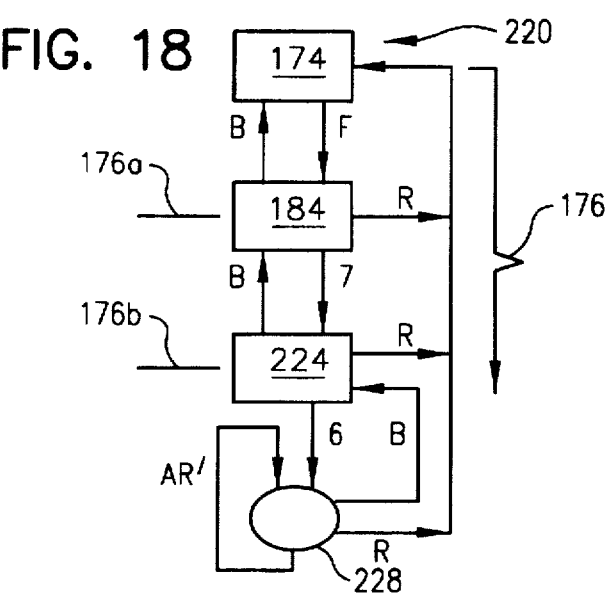

SYSTEMS WITH A REMOTE CONTROL IN WHICH INFORMATION CAN BE RETRIEVED FROM AN ENCODED, LASER READABLE DISC

This is a divisional application of Ser. No. 505/969 filed on Jul. 24, 1995.

TECHNICAL FIELD OF THE INVENTION

The present invention relates to a novel, user friendly system with a remotely operable, integrated unit or module capable of converting to visual and audio outputs both television signals and information retrieved from an onboard, laser readable, data storage device.

In a typical application of the invention, the system is designed to be employed in a home-type kitchen and to make available both television programs and information of interest to a cook; and the principles of the invention will be developed primarily by reference to this exemplary application of those principles. It is to be understood, however, that this is being done for the sake of brevity and clarity and is not intended to limit the scope of the appended patent claims.

DEFINITION

"Television set" is used herein in a generic sense to include both television monitors and television receivers.

BACKGROUND OF THE INVENTION

It is well-known that many cooks enjoy watching television while they are in the kitchen, and it is equally well recognized that many of those persons have a need for information regarding tasks in which they are engaged. This is demonstrated by the popularity of cooking shows on television. Unfortunately, those shows are more entertaining than informative; they do not provide information which may be needed by the cook or present information in a form which allows the information to be conveniently utilized by the cook.

Other methods of presenting information to a cook have their own drawbacks. Cookbooks are often awkward to use while engaged in food preparation. "Computer cookbooks" require expensive equipment which may take up an unacceptable amount of space and may be perceived to be out-of-place in a kitchen because of the risk of damaging the computer with soiled hands, by the accidental spillage of liquids, etc. Furthermore, the cook is tied to the location of the computer's input device and, perhaps more importantly, many may be unwilling to deal with a computer at all. Also, reliance on both printed and computer cookbooks requires that one supply a separate television set for that commonly wanted source of information and entertainment. This can make a computer cookbook unacceptable from viewpoints of space requirements and costs.

Thus, there is an existent and continuing need for a unit which can be easily controlled by a user as she or he moves about an area to make available either a television broadcast or easily and speedily retrievable, stored information needed for the task in which the user is engaged. A further attribute, if not absolute requirement, is that the product be self-teaching—i.e., that it have the ability to coach a user on its use so that the user does not have to consult written instructions at all, let alone an instruction manual having the complexity of those commonly accompanying personal computers and electronic entertainment devices such as VCR's and compact disc players.

SUMMARY OF THE INVENTION

Such novel, integrated, multifunctional units have now been invented and disclosed herein. These units combine, in a single cabinet, a television set and a player for a laser readable, data storage device such as a video compact disc, an audio compact disc, a laser disc, or one of the soon to be available digital video discs. The television set is for the most part conventional. It has the customary onboard controls and input jacks for making connections to an antenna, a cable system, a VCR, etc. Video compact discs are typically preferred over video discs and other usable information storage devices such as audio compact discs at the present time although this preference may shift as digital video discs become available because the latter have a significantly greater capacity (5–10 gigabytes). Compact discs are easily handled and stored, and the circuitry needed in the integrated unit to connect the compact disc player output to the television set is relatively simple and correspondingly inexpensive. Video discs are preferred over audio discs because a visual/audio presentation of a subject (or even a visual presentation alone as in the case of a recipe) will typically be superior to sound alone in conveying information to the system user.

Stored on the preferred video compact disc are an introductory video which describes the operation of the unit; a hierarchy of user-retrievable, multiple choice menus; and, for each of the choices in the lowest level menu employed in navigating a particular course through the hierarchy, the instructions or other information sought by the user. The selected information can be displayed statically on the screen of the integrated unit or presented as a video for visual and audible reception, often as a demonstration of a technique for performing a particular task. These dynamic presentations are preferably of short duration and focused on specific items of information so that the presentation can be readily assimilated by the user.

The introductory video allows a new user to easily use the system to access selected information on the very first try without training or guidance from another person and without consulting written instructions. For many, the elimination of the need to refer to written instructions is of paramount importance as they consider any more than the most rudimentary written instructions distasteful, if not something to be avoided at all costs.

Associated with the integrated unit is a novel remote control which allows the system user to control the integrated unit functions from the location where he or she is performing a task or is otherwise occupied rather than tying the user to a specific location to look up information as is the case with conventional and electronic cookbooks. The remote unit has controls for all of the conventional television functions and a control which allows the user to switch at will between the television and information accessing modes of operation. Controls for the disc player may also be provided at the expense of increasing the complexity of the remote control.

When the information accessing mode of operation (the COACH mode) is selected after the integrated unit is turned on, that unit plays the introductory, instructional video. By depressing a single, RESTART button on the remote control, the user can recycle to the beginning of the video after it has finished playing or at any time while the video is playing. This is particularly advantageous to the new user who can thereby easily play the introductory video as many times as is perceived to be necessary to assimilate information which the video presents.

A second, FWD (forward) button allows the user to skip at any point in the introductory video to the highest level menu in the menu hierarchy. Unless the FWD button is first pressed, the advance to the top level menu will automatically occur when the introductory video ends.

Once the highest level menu is reached, the user is instructed to navigate through the menu hierarchy by using numbered—①through ⑨—buttons on the remote control to, beginning with the top level menu, select one of the menus available on each successively lower level and to make a choice of the items of information available from the lowest level menu in a particular set of menus. Choices of lower level menus and of items of information are numbered so that the user can make a choice by pressing the correspondingly numbered button.

If the choice from the selected lowest level menu results in a video or audio selection being played (typically one lasting from 10 seconds to 2 minutes), the user is automatically returned to the menu (lower level) from which the selection is made upon completion of the presentation.

If a static display of information is present on the integrated unit screen, that display will stay on the screen until taken off by the user. That is done by pressing a BACK button on the remote control unit. This returns the user to the menu from which the information was selected.

The BACK button can also be employed to back the user up through the hierarchy of menus to the top level menu and from the latter to the introductory video. The user is backed up one step each time this button is pressed.

The integrated unit is preferably constructed so that, unless it is first turned off, operation in the information mode of operation will continue from the point where it is interrupted if the unit is switched from the instructional and information retrieval (COACH) mode to the television mode. This is another important feature of the invention from the viewpoint of convenience. The user is thereby relieved of the task of navigating through the introductory video and perhaps an entire hierarchy of menus to the point previously reached if he or she wishes to interrupt a search for, or the display of, information to watch television and to then return to the search or viewing of the displayed information.

There are occasions on which a user may wish to review all or part of the introductory video after having navigated part way or all the way through the hierarchy of menus. The user can return to the beginning of this video from any level of operation by depressing the RESTART button on the remote control unit once.

The numbered choices available on each of the menus in the hierarchy are preferably limited to nine. This makes it possible to select any option from a menu by pressing a single, correspondingly numbered button on the remote control. The one-button feature is thus also a significant contributor to the featured ease of operation of the present invention.

Another feature of the remote control is that its interior is completely isolated from the surrounding environment. This is important as liquid, particulate, and other contaminants abound in kitchens and in other environments where systems employing the principles of the present invention are perhaps most likely to be used.

In addition, the remote control is preferably so designed and constructed that it can be easily operated with one hand and without picking it up and so that its controls are easily viewed at arm's length. Both of these features are important for one engaged in other tasks. In preferred forms, the remote control is designed to sit firmly on a table, countertop, etc. with function controlling buttons extending through a sloping (or inclined) face so that these buttons can be easily seen and pressed.

It is preferred that the remote control employ a radio frequency (R-F) transmitter as opposed to an infrared or other device to transmit or broadcast control signals to the integrated unit of the system. This makes the aiming of the remote control at the sensor of the integrated unit much less critical. This can also be significant to one using the remote control while engaged in another task.

The integrated unit of the present invention is typically portable, as was discussed above. This unit is light and has a small footprint. It can therefore be readily handled and takes up a minimum of perhaps limited counter or other surface space. The objective of nonobtrusiveness may be furthered by employing an integrated unit cabinet which features a carrying handle in its top wall and by a complementary bracket to which the handle can be coupled. This arrangement allows the unit to be mounted beneath a kitchen cabinet or in another, relatively out-of-the way or nonintrusive location.

Still another, and obviously very important, advantage of the invention is that it may be readily adapted for use in one environment to another. All this requires is a disc or other information storage device coded with information appropriate for the alternate purpose. Similarly, added information storage modules can be supplied to increase the amount of information available on a particular subject, be it food selection and preparation or a different area of interest. The use of easily loaded and replaced information storage devices such as inexpensively supplied compact discs also makes it very practical to combine easily accessed and almost immediately accessible information in different categories which may be useful to one in a particular setting. For example, a hierarchy of menus concerned principally with food selection and preparation may include at one level a menu with choices giving information on or demonstrating first aid procedures for dealing with accidents apt to occur in a kitchen or elsewhere in the environment of a home.

The objects, advantages, and features of the invention will be apparent to the reader from the foregoing and the appended claims and as the ensuing detailed description and discussion of the invention proceeds in conjunction with the accompanying drawings.

BRIEF DESCRIPTION OF THE DRAWINGS

FIG. 7 shows, diagrammatically, one representative navigational chart which includes an introductory video and a hierarchy of menus that can be quickly and easily navigated by a user of the FIG. 1 system to reach information of interest stored on a video compact disc or other data storage device;

FIG. 13 is a navigation chart akin to that of FIG. 7 but differing in that: (a) more levels in the menu hierarchy are employed, and (b) the selection of an option from the lowermost menu results in a dynamic, video presentation of information; in the illustrated sequence of selections, this a video on making pan gravy;

FIG. 18 depicts a third navigation chart which leads in a minimum number of steps to an instructional video which is automatically recycled until stopped by the user; this rapid access to, and automatic representation of, information is particularly useful to one engaged in rendering first aid, for example.

DETAILED DESCRIPTION OF THE INVENTION

Figure 1:
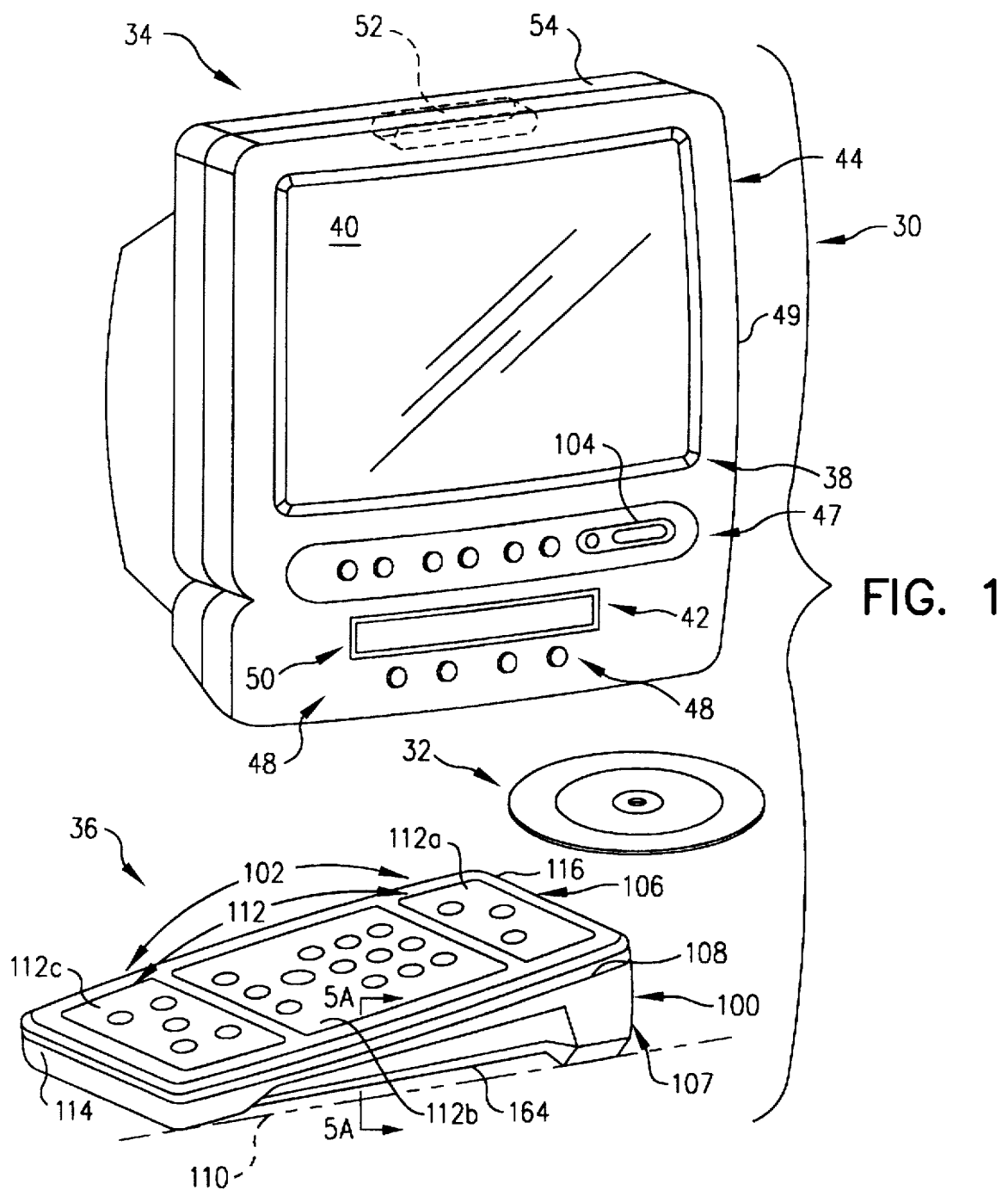
FIG. 1 depicts, pictorially, an entertainment/information system embodying the principles of the present invention.

Referring now to the drawings, FIG. 1 depicts an entertainment/information system 30 which embodies the principles of the present invention and is so constructed that one can easily, and at any time, switch between: (a) television, and (b) the retrieval and presentation of information stored in digital data file on a device such as the illustrated video compact disc 32. The major components of system 30, aside from data storage device 32, are an integrated unit (or module) 34 and a remote control 36.

Integrated unit 34 includes a television set 38 with a screen 40 and a video compact disc player 42, both housed in the same cabinet 44. Conventional controls 46 for television set 38 are located on the front panel 48 and one side panel 49 of cabinet 44, and controls 47 for disc player 42 are also located on front cabinet panel 48. A conventional tray 50 is used to load a disc 32 into player 42.

In the interest of making system 30 user friendly, the controls 46 and 47 are preferably color coded. Those controls typically provided and a representative color coding scheme appear in Table 1 below:

TABLE 1

| TELEVISION Front Cabinet Panel 48 | | |
|---|---|---|
| Control | Color | Function |
| ON/OFF | GREEN | Turns television set 38 and disc player 42 on and off, both at the same time |
| Volume+ | GRAY | Increases sound level |
| Volume– | GRAY | Decreases sound level |
| Channel+ | GRAY | Increases channel number by one |
| Channel– | GRAY | Decreases channel number by one |
| Side Cabinet Panel 49 | | |
| Contrast | BLACK | Shifts or decreases picture contrast |
| Brightness | BLACK | Increases or decreases picture brightness |
| Color | BLACK | Increases or decreases picture color intensity |
| Tint | BLACK | Shifts picture hue between red and green |
| Sharpness | BLACK | Increases or decreases picture sharpness |
| DISC PLAYER Front Cabinet Panel 48 | | |
| Eject | GRAY | Opens Drawer 50 |
| Play | GREEN | Begins playing video compact disc 32 |
| Stop | GRAY | Stops playing video compact disc 32 |
| Forward | GRAY | Skips forward and plays next selection on video compact disc 32 |
| Back | GRAY | Skips back and plays previous selection on video compact disc 32 |

It is not critical that the particular complements of controls identified in Table 1 be employed. Particularly in the case of the disc player, additional controls can be provided for additional modes of operation such as random play, programmed order of play, etc.

Portability is promoted to a significant extent by the integration of television set 38 and disc player 42 into a single module. This reduces to the smallest number the units that must be handled and eliminates the external cables that would otherwise be required as well as the onerous and technical task of hooking up the components. Instead, all that is necessary is to locate unit 34 in an appropriate place, plug its external power cord (not shown) into an electrical outlet, and plug a lead from an antenna or cable TV outlet into the unit.

As mentioned above, video compact discs are preferred as they are easily handled and stored, yet have enough data storage capacity to make available dynamic, visual/audio presentations of information. Also, compact discs are durable and impervious to contamination and rough handling. Nevertheless, it is not essential that this particular type of information storage device be employed. Alternatives include laser discs which, while perhaps more cumbersome, have the advantage of holding more information, and audio compact discs, which can be employed in circumstances in which there is nothing to be gained by a visual presentation of information.

Figure 2:
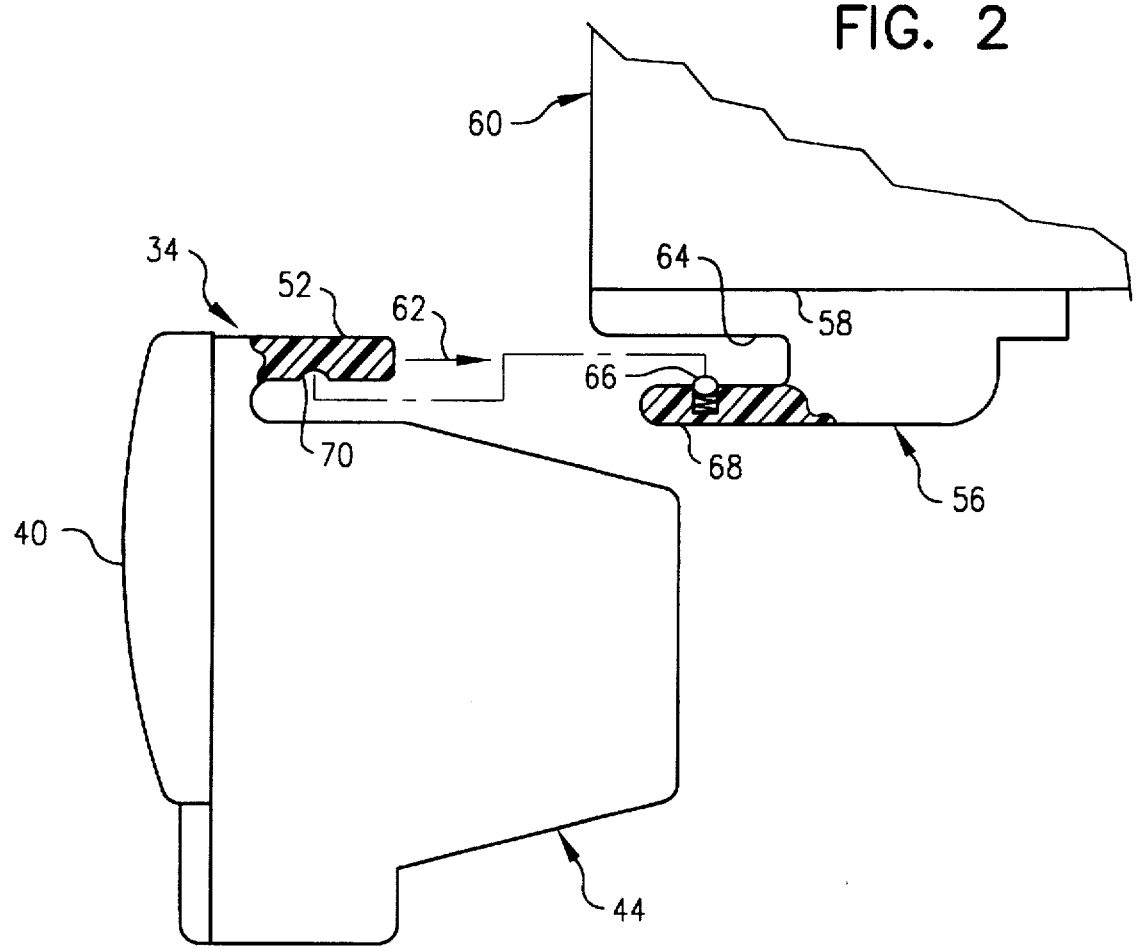
FIG. 2 is a pictorial view included to show a mounting arrangement for an integrated unit of the FIG. 1 system; unnecessary details of the integrated unit have been omitted in this figure.

Integrated unit 34 is lightweight and portable, and handling is facilitated by a handle 52 integrated into the top wall 54 of cabinet 44 (see FIGS. 1 and 2). Integrated unit 34 also has the advantage of a small footprint. This is advantageous in those applications of the invention where the space available to support the integrated unit is at a premium.

Also, integrated unit 34 may be advantageously kept out of the way by employing the support bracket 56 shown in FIG. 2. In the representative, kitchen-employed application of the invention, bracket 56 is mounted to the bottom 58 of an upper kitchen cabinet 60. Integrated unit 34 is shifted in the direction indicated by arrow 62 in FIG. 2 to displace handle 52 into a complementary recess 64 in bracket 56. This movement in the arrow 62 direction is continued until a spring-loaded detent 66 in lower flange 68 of bracket 56 engages a complementary recess 70 in handle 52 to removably lock integrated unit 34 to bracket 56. The same type of mounting arrangement may of course be employed in other applications of the invention to support integrated unit 34 from an overhead structure in an unobtrusive location.

Figure 3:
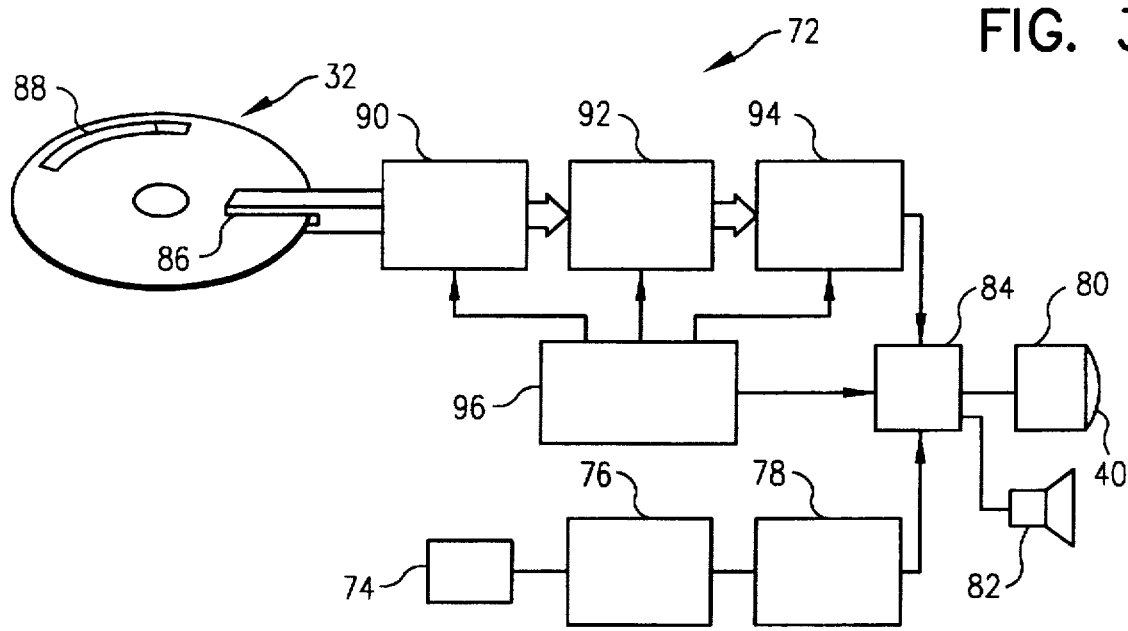
FIG. 3 shows, in schematic form, the operating system of the integrated unit.

The internal, operating components of integrated unit 34 are depicted schematically in FIG. 3 and identified by reference character 72. These components include input jacks which are collectively identified by reference character 74 and are employed to connect the integrated unit to a television signal source—a television antenna or cable and/or a VCR. A tuner 76 is employed by the user to select one of the available television channels to watch or to the VCR channel (usually 3 or 4) at the user's location. The selected (off-the-air or VCR) signal is directed to a video/audio generator 78 which converts the selected incoming signal to a video signal which is converted to visual images by cathode ray tube (CRT) 80 and displayed on the CRT screen 40 of television set 38 and to an audio signal which is converted to audible sound as by the illustrated speaker 82. The video and audible signals are routed to CRT 80 and speaker 82 through an electronic switching device 84 which allows a user to choose between television reception and the retrieval of information from storage disc 32.

The television set 38 and disc player 42 are powered up together so that integrated unit 34 is always available for use in the COACH mode when unit 34 is turned on. Most system users can be expected to watch television more often than they retrieve stored information. Therefore, mode switching device 84 is so programmed or constructed that unit 34 will default to the television mode of operation when integrated unit 34 is turned on.

Referring still to FIG. 3, video compact disc player 42 has a conventional mechanism (not shown) for spinning the laser readable disc and an equally conventional laser pickup 86 for reading information stored in digital data files in the tracks 88 on discs 32 (only one of which is shown). The output from pickup 86 goes to a data reader 90, which outputs a stream of digitally compressed data (the form in which the data is stored on disc 32). The data reader is connected to a decompressor 92 for the data retrieved in the compressed format. After decompression, the data is routed to an analog signal generator 94 which converts the data to video and audio analog input signals utilizable by CRT 80 and speaker 82 to generate visual images and audible sound. The operation of the data reader, the data decompressor, and the signal generator is controlled in a conventional manner by microprocessor 96.

Referring now to FIGS. 1, 4, 5, and 5A, the remote control 36 of entertainment/information system 30 frees the user of the system from the location of integrated unit 34. This is a feature of particular significance from the viewpoint of convenience, if not that of practicality. In the typical, kitchen application of the invention, for example, this allows the user to access information stored on disc 32 at the location where the user is engaged in the task regarding which information is sought. This contrasts directly with the modus operandi of written and electronic cookbooks which require that the user go to the cookbook location to retrieve the information.

Remote control 36 differs from a conventional electronic equipment remote control in that it need not be picked up to be operated but can be conveniently employed while located on a table, countertop, etc., thus requiring only one hand for operation. As indicated above, this feature is of considerable importance because those using a system of the character described herein may simultaneously be engaged in a task which makes it inconvenient, if not impractical, to use a conventional remote control requiring one hand to hold the device and the other to press its operating buttons.

Another important feature of remote control 36 is that the interior 98 of this unit (see FIGS. 5 and 5A) is sealed. This keeps liquids, dust, and other foreign matter apt to be present in kitchen and other environments in which system 30 can advantageously be employed from penetrating to interior 98 of the remote control. Foreign matter can interfere with the operation of, if not actually damage, the internal remote control components.

Remote control 36 includes a casing 100 and a complement of controls collectively identified by reference character 102 for operating integrated unit 34. These controls are preferably of the pushbutton type, with the actuation of each button causing remote control 36 to broadcast a distinctly coded operating signal to integrated unit 34. It is preferred that radio frequency (R-F) signals be employed. Signals in this frequency range have a relatively broad dispersion pattern. Therefore, the accuracy with which remote control 36 has to be aimed at the sensor 104 on the front panel 48 of integrated unit cabinet 44 to operate television set 38 or disc player 42 is not critical. This is a significant convenience to a user of system 30, who may be engaged in another task while using the remote control and may furthermore be employing the remote control in a tabletop or comparable mode of operation with the remote control so oriented that the axis of the transmitted signal is not precisely aligned with sensor 104.

Like those on the front and side panels 48 and 49 of integrated unit cabinet 44, the controls 102 of remote control 36 are preferably color coded. Table 2 below identifies a representative set of controls, the colors assigned to the controls, the modulation frequency of the signal transmitted when each of the controls is pressed, and the function of each control.

TABLE 2

| Control | Color | Modulation Frequency | Function |
| --- | --- | --- | --- |
| ON/OFF | GREEN | 4100 Hz | Turns television set 38/ disk player 42 on and off |
| TV | GRAY | 4300 Hz | Places the television set 38 of integrated unit 34 and the remote unit controls 102 in the television mode |
| COACH | GRAY | 4500 Hz | Plays an in- |

TABLE 2-continued

| Control | Color | Modulation Frequency | Function |
|---|---|---|---|
| | | | troductory video and switches the buttons on remote control 36 to their COACH mode functions so that a user can view the introductory video and/or navigate through a hierarchy of menus to information on a subject of interest |
| ①...⑨ | GRAY | 4700–6700 Hz | In the television mode--select a television channel and/or the VCR channel; in the COACH mode -- select a correspondingly numbered option from a menu |
| RESTART | RED | 6900 Hz | Jumps to the introductory video |
| BACK | GRAY | 7100 Hz | Retreats to the previous step in a COACH mode sequence |
| PAUSE | GRAY | 7300 Hz | Freezes operation in the COACH mode until pressed again |
| FORWARD | GRAY | 7500 Hz | Advances to the next step in a COACH mode sequence of steps |
| CHANNEL+ | GRAY | 7700 Hz | Selects the next higher television channel |
| CHANNEL– | GRAY | 7900 Hz | Selects the next lower television channel |
| MUTE | GRAY | 8100 Hz | Turns the sound off until pushed again |

Remote control casing 100 has an upper component 106 and a complementary lower component 107. The upper edge 108 of lower component 107 lies at an acute angle with respect to a horizontal surface 110 on which remote control 36 is placed. This results in the faceplate 112 of the remote unit sloping from the foot 114 of the unit to its head 116 (see FIG. 1). The buttons of control complement 102 are as a consequence much more visible (even at arm's length) and much more easily pressed than would be the case if the remote unit (typically relatively thin) were lying flat. In that case, one would have to look almost directly down on the device from a close distance to see, and accurately manipulate, its control buttons.

Figure 5:
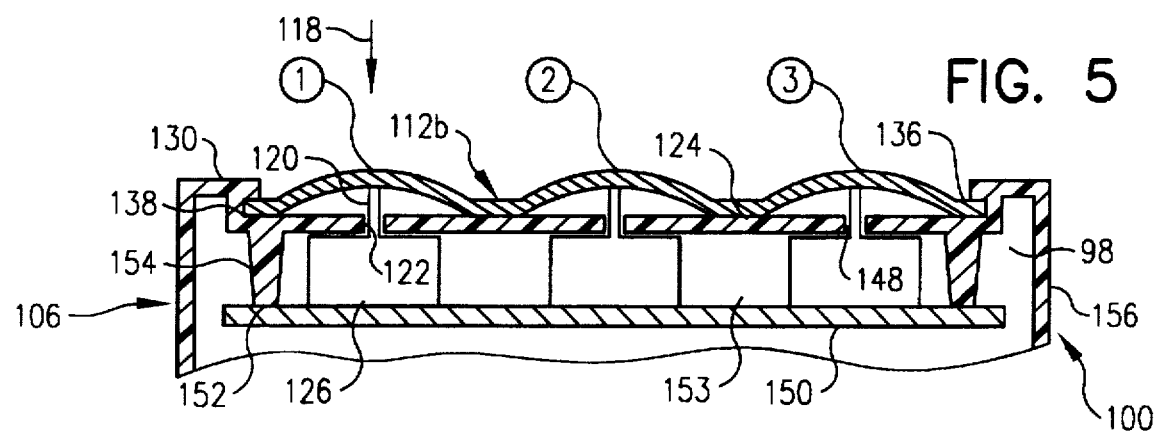
FIG. 5 is a partial section through the remote control, taken substantially along line 5—5 of FIG. 4.

Turning now to FIG. 5, the remote control buttons (the representative ones shown are ①, ② and ③) may advantageously be provided in the form of convex protuberances which are integral with the faceplate 112 of remote unit 36 with the faceplate being fabricated from a material which is sufficiently resilient that the protuberances can be pressed as suggested by arrow 118 in FIG. 5. The pressing of a button in complement 102 displaces in the same arrow 118 direction a corresponding switch actuator 120 extending through an opening 122 in the top wall 124 of upper remote control casing component 106 and guided for rectilinear movement in the arrow 118 direction by the surrounding material of the top wall. The arrow 118 direction of movement of actuator 120 closes a corresponding, actuator-associated switch 126. This enables conventional R-F signal generating and multiplexing circuitry in the interior 98 of the remote control (see FIG. 6) to transmit a coded, modulated R-F signal unique to the button which is pressed.

Figure 4:
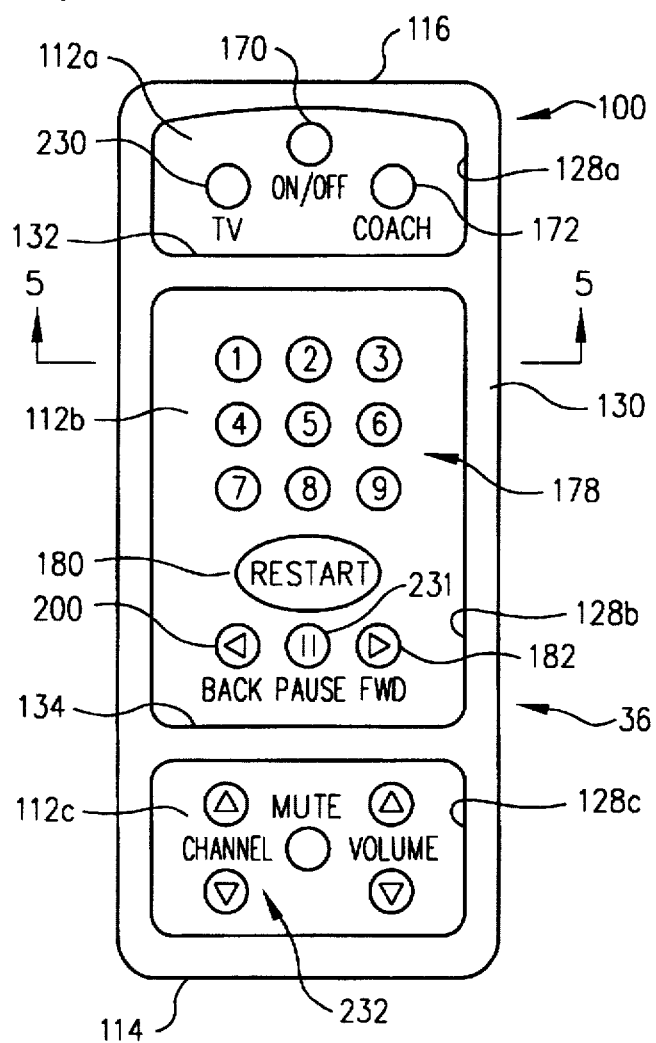
FIG. 4 is a plan view of a remote control which is another component of the FIG. 1 system.

Referring still to FIG. 5, the faceplate 112 of remote control 36 is typically divided into three segments such as those identified in FIG. 4 by reference characters 112a, 112b, and 112c, respectively; and complementary, faceplate receiving recesses 128a–c in remote control casing upper component 106 are defined by segments of a rim 130 around the periphery of upper casing component 106 and by transversely extending ribs 132 and 134 which are integral with upper casing component 106. Those edges of rim 130 and ribs 132 and 134 bounding each of the faceplate receiving recesses 128a–128c are slotted as indicated by reference character 136 in FIGS. 5 and 5A. Around its periphery, the edges 138 of each faceplate segment 112a–c are seated in segments of the associated complementary slot 136 to retain the faceplate segment in place.

Figure 5A:
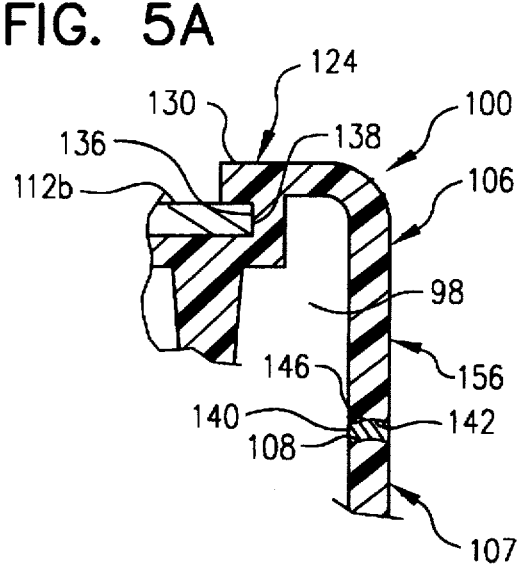
FIG. 5A is a second, partial section through the remote control, taken substantially along line 5A—5A of FIG. 1.

Referring now most specifically to FIGS. 5 and 5A, it was pointed out above that the isolation of remote control interior 98 from fluid, particulate, and other foreign substances is an important feature of the present invention as system 30 will typically be employed in environments in which such substances are prevalent.

Penetration of foreign material through the gap 140 between the lower edge 142 of upper casing component 106 and the upper edge 108 of lower casing component 107 is precluded by adhesively or otherwise bonding a circumferentially extending gasket 146 between the upper and lower casing edges. The illustrated, undulant edge-and-gasket configuration is preferred for maximum sealing efficiency.

The penetration of foreign matter through the gaps between switch actuators 120 and the apertures 122 in upper casing component top wall 124 (a representative gap is identified in FIG. 5 by reference character 148) is precluded by the arrangement shown in FIG. 5. In particular, the switches 126 are mounted on a platform 150. This platform is bonded to the lower edge 152 of a depending, circumferential imperforate boss 154 integral with top wall 124 of upper casing component 106. The boss is so configured and spaced from the side wall structure 156 of the upper casing component that all of the switches 126 are embraced and surrounded by the boss and isolated from the interior 98 of casing 100 in a compartment 153 defined by casing top wall 124, boss 154, and switch platform 150. The result is: (a) a primary seal between the edges 138 of faceplate segments 112a–c and the upper casing component structure bounding the faceplate segments, and (b) a secondary seal between the lower edge 152 of boss 154 and switch support 150. This combination of primary and secondary seals and the gasket 146 between the upper and lower casing components 106 and 107 effectively keeps foreign material from the interior 98 of remote control casing 100.

Figure 6:
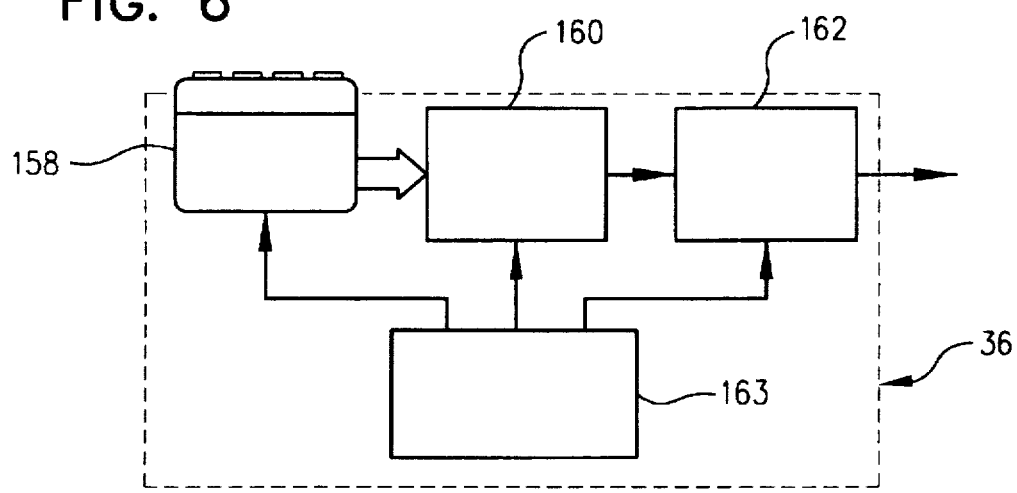
FIG. 6 depicts, in schematic form, the operating system of the remote control.
Figure 8:
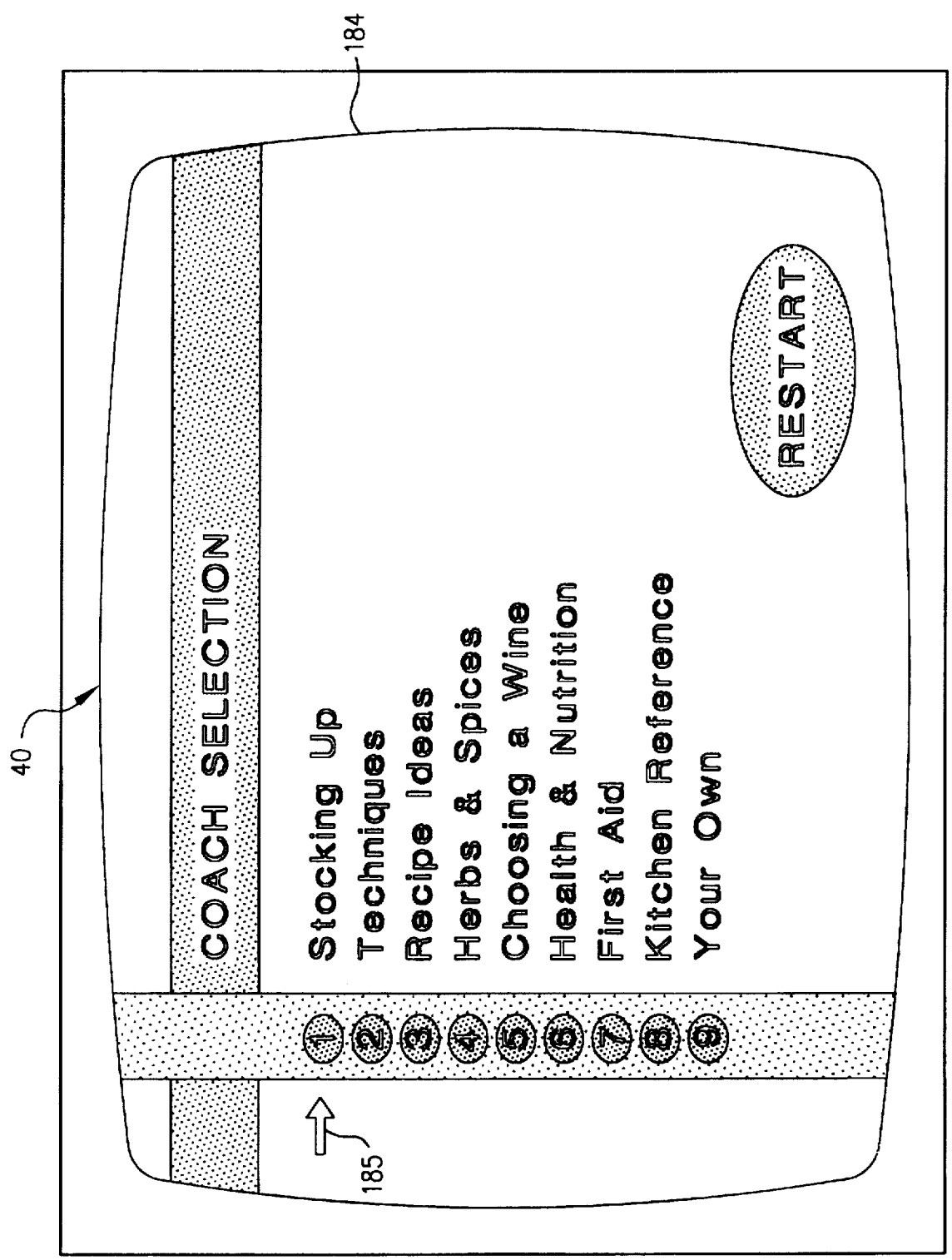
FIGS. 8–10 depict a representative set of menus which would be displayed to a user following the FIG. 7 navigation chart to reach information on dry and bottled goods with which a pantry might be stocked.
Figure 9:
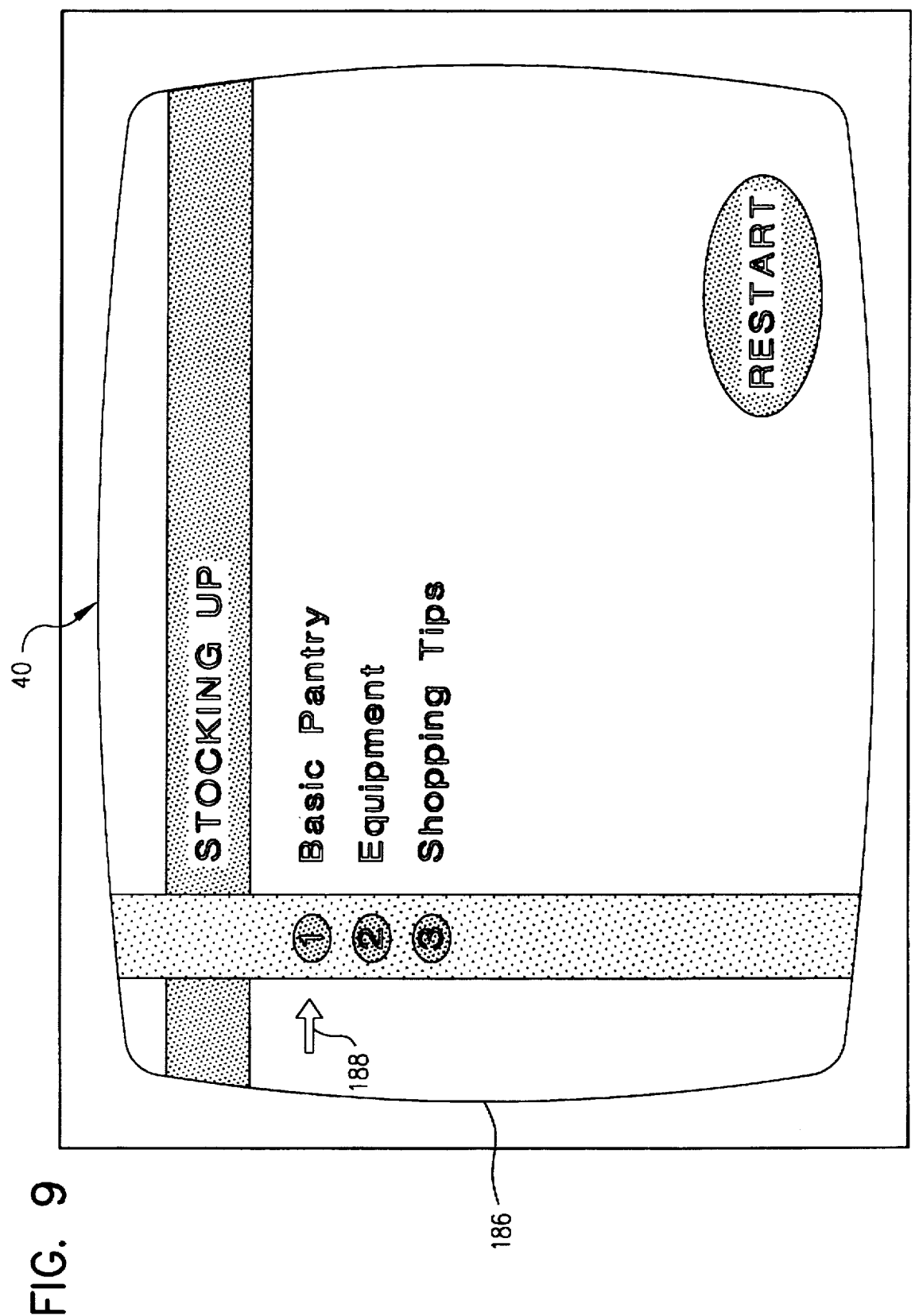
Figure 10:
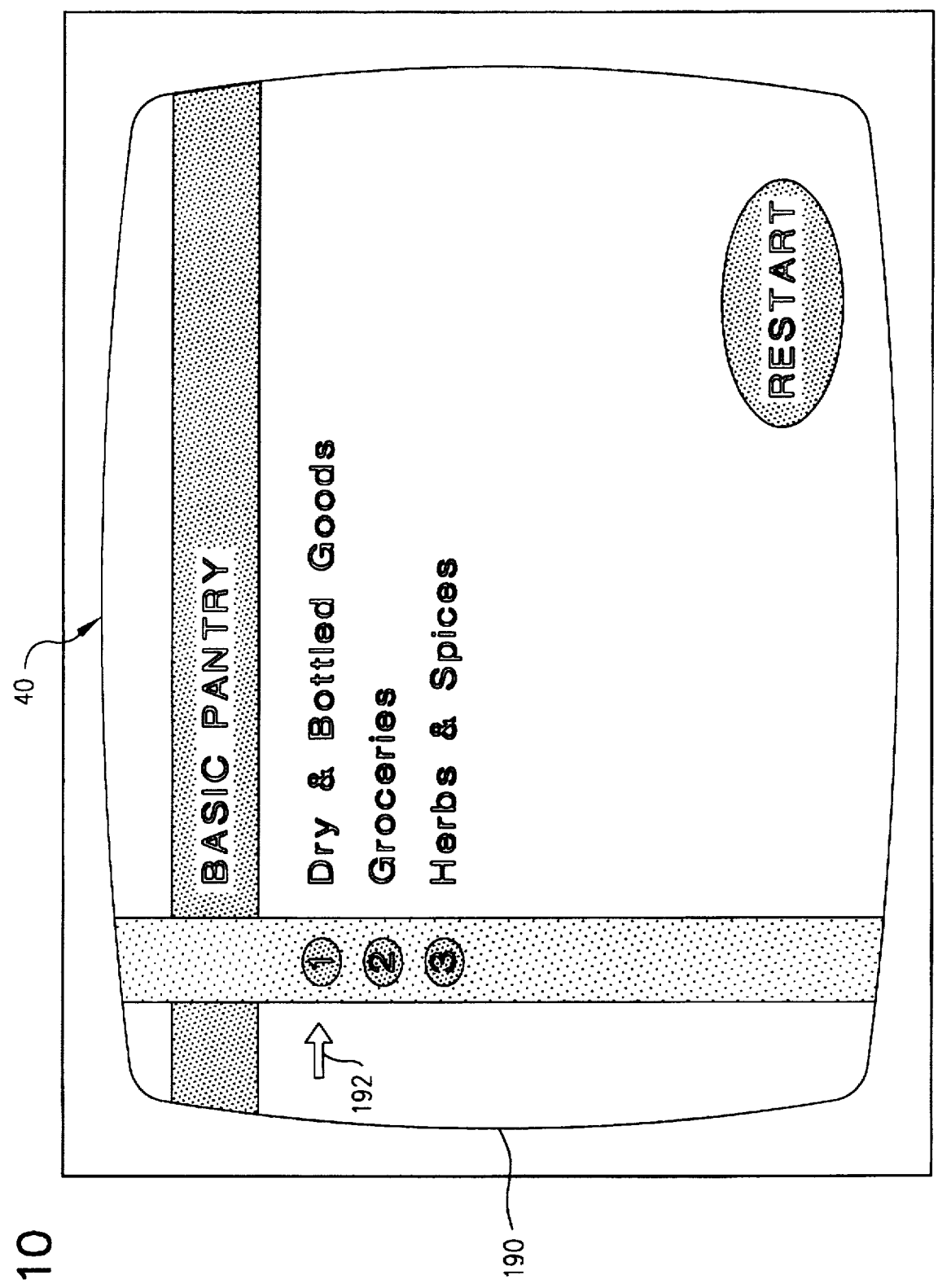

The signal generating and transmitting components of remote control unit 36 are shown in block diagram form in FIG. 6 and identified by reference characters 158, 160, and 162. These are, respectively, a keypad decoder, a R-F modulator, and a R-F transmitter. These components are of conventional construction, and their details are not part of the present invention. Accordingly, the subject circuits will not be described in detail herein.

Referring still to FIG. 6, a battery 163 is also housed in casing 100 to supply operating power to the just-described circuit components. The conventional opening (not shown) can be provided in the bottom wall 164 of lower casing component 107 so the battery 163 can be removed and replaced. A gasket is preferably provided between the removable cover for this opening and the casing bottom wall to keep foreign material from casing interior 98. A nonskid material (not shown) may be applied to bottom wall 164 at the foot 114 and head 116 of remote control 36 to eliminate slippage between the remote control and the surface 110 on which the unit is placed.

Referring still to the drawing, the chart 168 in FIG. 7 depicts one representative course that may be navigated to retrieve information on a selected subject from compact disc 32 and to display that information on the screen 40 of integrated unit 34. In this representative example, it is assumed that the user of system 30 is seeking information on stocking a pantry with dry and bottled goods.

First, the reader is reminded that integrated unit 34 defaults to the television reception mode of operation when the on-off switch 170 in the remote control complement 102 is pressed to turn on the television set 38 and disc player 42 of the integrated unit. To switch to the information retrieval or COACH mode, the user presses COACH button 172. This results in an introductory video 174 being retrieved from disc 32 and played. The introductory video describes the operation of system 30 and tells the user how to reach information on a subject of interest. This is done by navigating through a hierarchy of menus identified by reference character 176 in FIG. 7.

A representative system 30 employing the principles of the present invention will have five levels of menus, and the menus at each level may afford the system user up to nine choices. The hierarchal structure thus "fans out" from level-to-next lower level, giving the user up to 59,049 choices if five levels are used and if all menus on all levels provide the permitted maximum of nine choices as shown by the following table.

TABLE 3

| Menu Hierarchy Level | Number of Menus | Number of Choices |
|---|---|---|
| (Descending Order) | | |
| Top (176a) | 1 | 9 |
| Second (176b) | 9 | 81 |
| Third (176c) | 81 | 729 |
| Fourth (176d) | 729 | 6561 |
| Bottom | 6561 | 59049 |

The choices at each level may be information—a static text, graphic, or text/graphic presentation or a video—instead of next lower level menu selections or a mixture of menu selections and informational choices. However, it may be desirable to avoid a mixed category to minimize confusion and promote ease of use.

It is emphasized that Table 3 is concerned only with a representative hierarchy of menus. There may be fewer—or more—than five levels in the hierarchy, and the hierarchy may be asymmetric. For example, at the third level of the Table 3 hierarchy, one or more of the menus may be a bottom level menu offering only options for selecting information available from that menu. Present at the same level may be one or more other menus offering choices leading to menus on the next lower (fourth) level. One example of an asymmetric hierarchy appears in FIGS. 7–20 of the drawings.

The choices available at each level are preferably limited to nine, and these are numbered so that, at every level, a choice can be made by pressing a single, correspondingly numbered one of the buttons ① through ⑨ in remote control numerical keypad 178 (see FIG. 4). This unique feature is another one which makes system 30 easy and convenient to use and therefore acceptable to a person without technical training or inclination and with only the instruction provided by introductory video 174.

Once the introductory video 174 has been played, the user has two options. One is to press the dedicated RESTART button 180 of remote control 36. This causes the introductory video to be replayed. The second option is to press the also dedicated forward (FWD) button 182. This results in the top (176a) level menu 184 shown in FIG. 8 being displayed. That menu has nine choices with choice one being appropriate to reach the information of interest in the representative information selection example under discussion as indicated by arrow 185 in FIG. 8. Therefore, the user presses button ① on remote control numerical keypad 178. This brings up a second (176b) level menu identified by reference character 186 in FIG. 9. This menu offers the user three choices with choice one being appropriate as indicated by arrow 188. Accordingly, the user presses button ① on keypad 178 again at this juncture. This brings up a third (176c) level menu 190 (see FIG. 10). This representative menu also offers the user three choices with choice one again being appropriate as indicated by arrow 192. The user accordingly presses keypad button ① for a third time.

Figure 11:
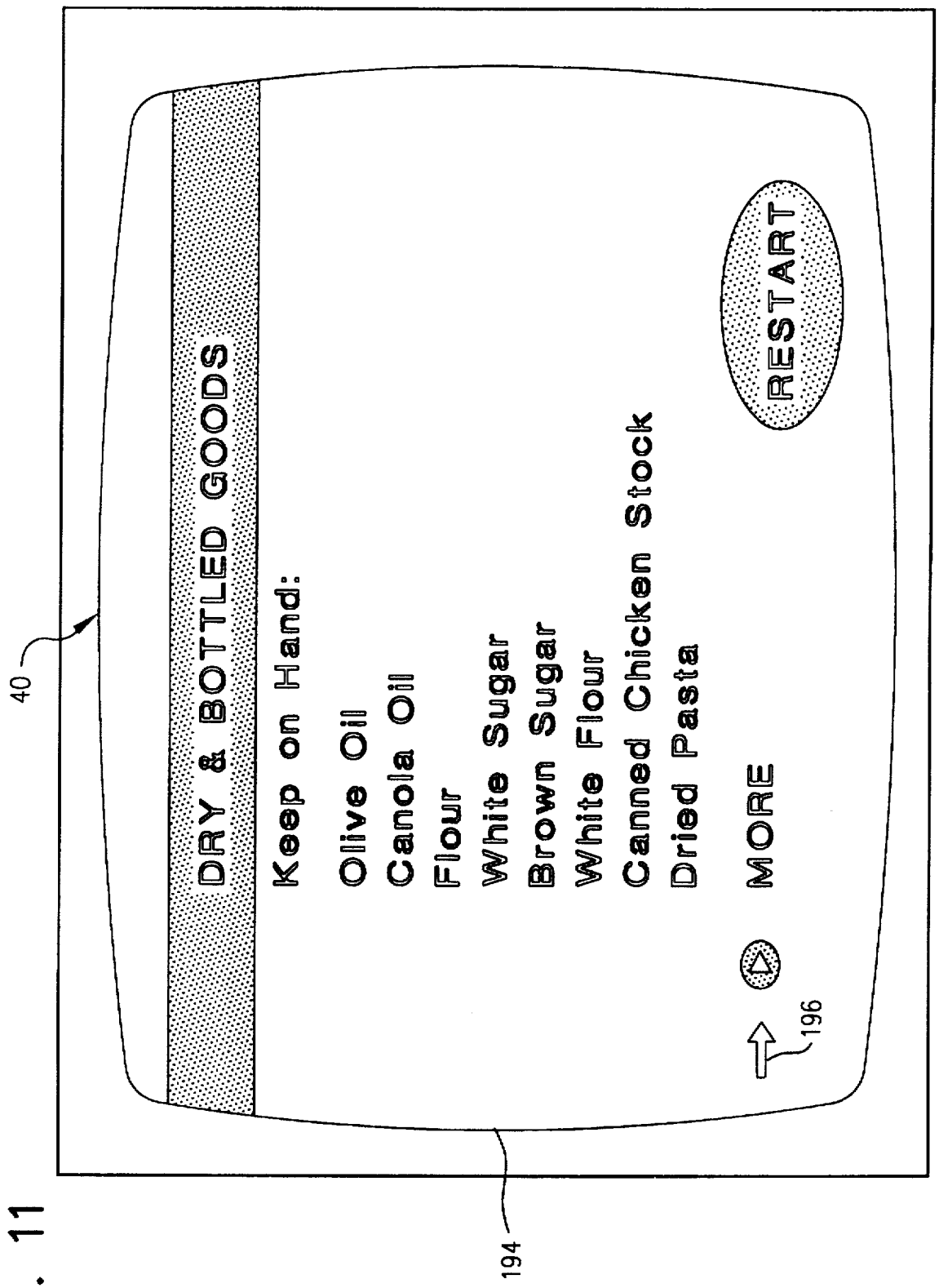
FIGS. 11 and 12 are two screens of information which are available for display to the system user when the user makes a choice from the lowest level menu in those hierarchically arranged menus depicted in FIG. 7.

Pressing keypad button ① for the third time retrieves and brings to the screen 40 of integrated unit 34 the information on stocking a pantry sought by the user of system 30. The screen that appears is shown in FIG. 11 and identified by reference character 194. The information sought by the user is displayed in textual form. It remains on screen 40 until further action is taken by the system user.

In this particular example, the information on the selected subject is too voluminous to fit on a single screen. In this and like cases, the legend MORE appears at the bottom of the screen. When that happens, the user can proceed to the next screen as suggested by arrow 196 by pressing remote control FWD button 182. In the current example, this brings up on screen 40 a second display shown in FIG. 12 and identified by reference character 198.

Screen 198 ends with the legend END OF TEXT, indicating that all of the information on the subject selected by the system user has been retrieved from disc 32 and displayed on screen 40.

Figure 12:
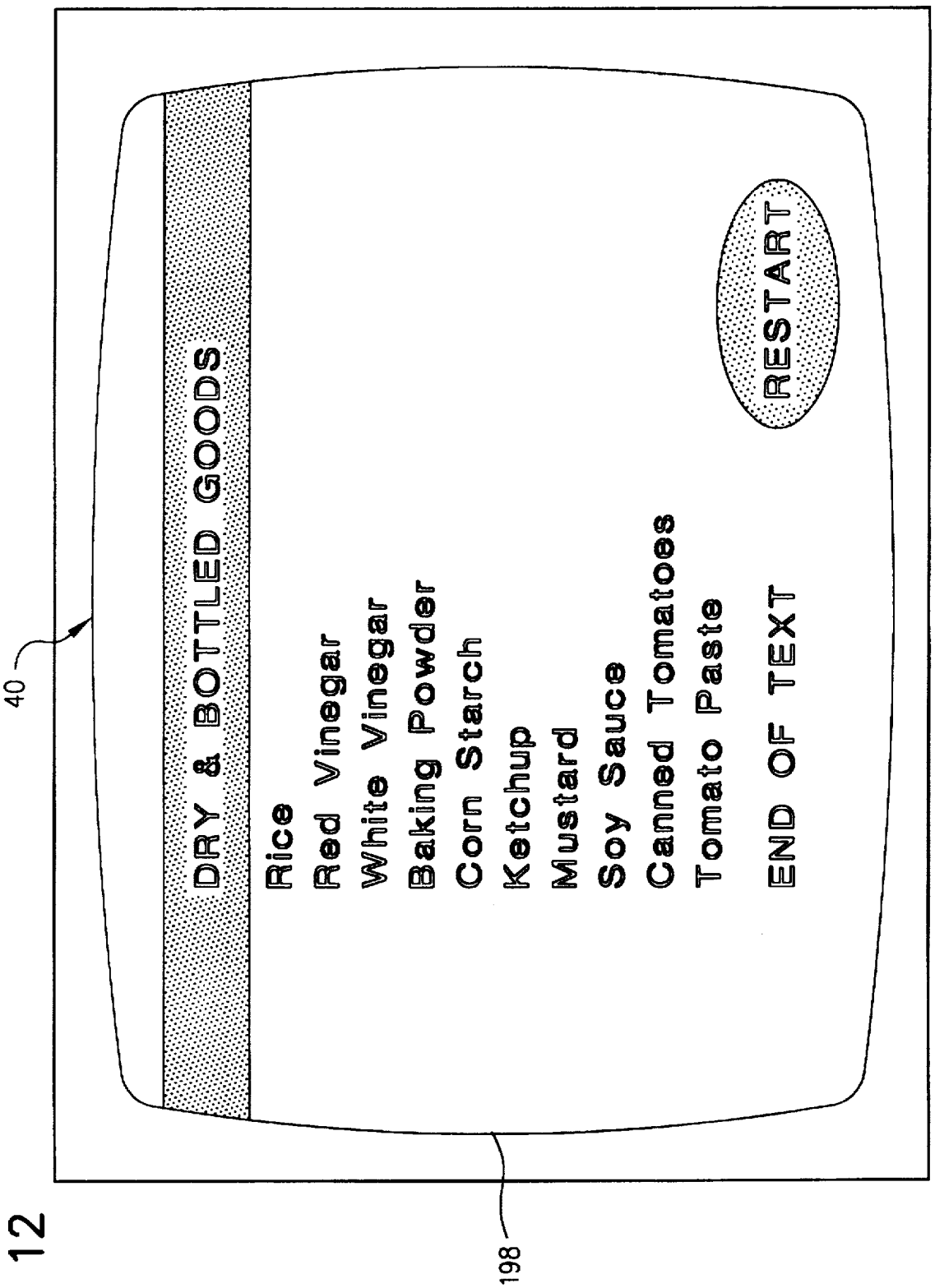
Figure 14:
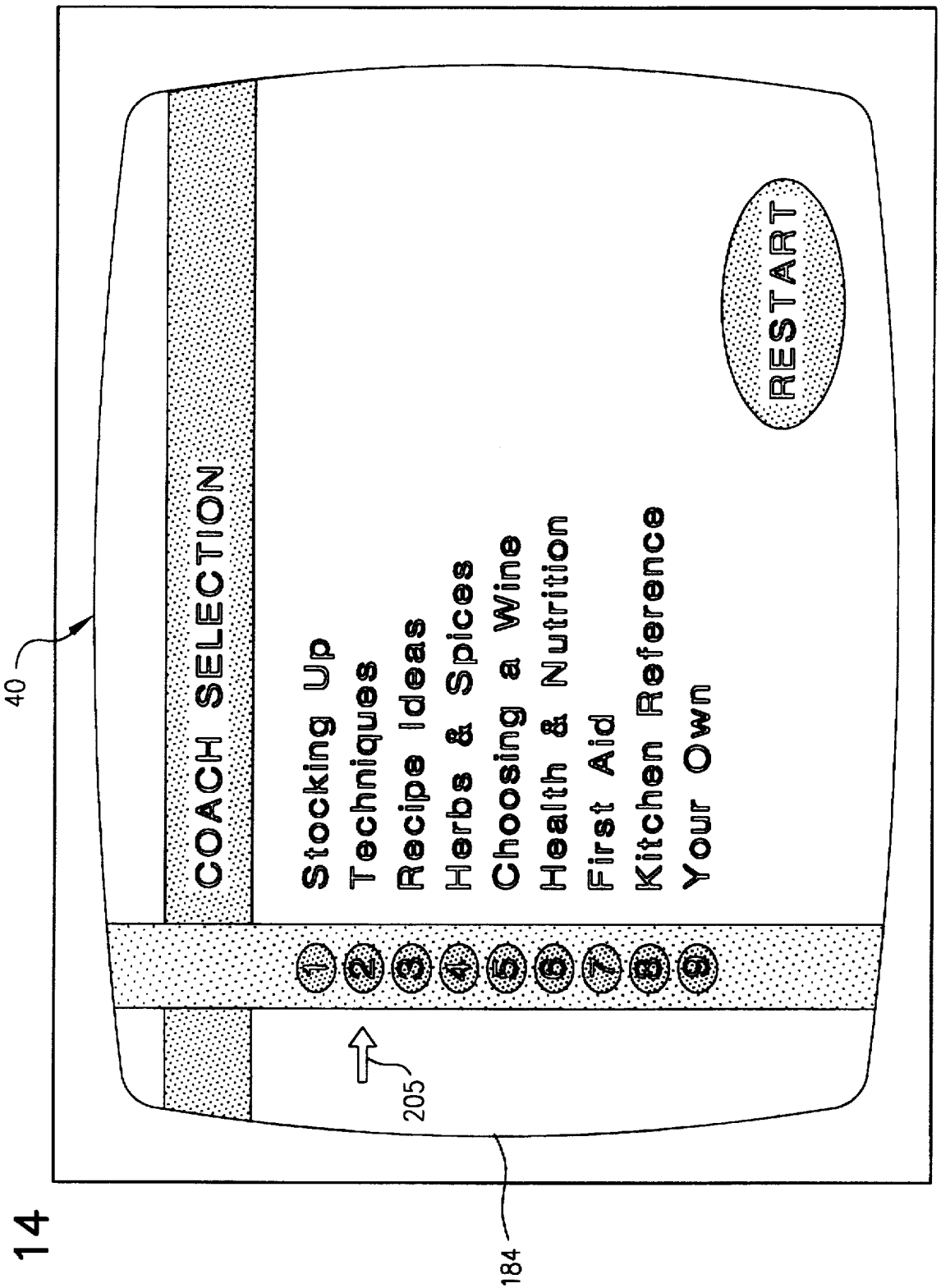
FIGS. 14–17 show the menus that are sequentially displayed to the user in following the course charted by the FIG. 13 plot.
Figure 15:
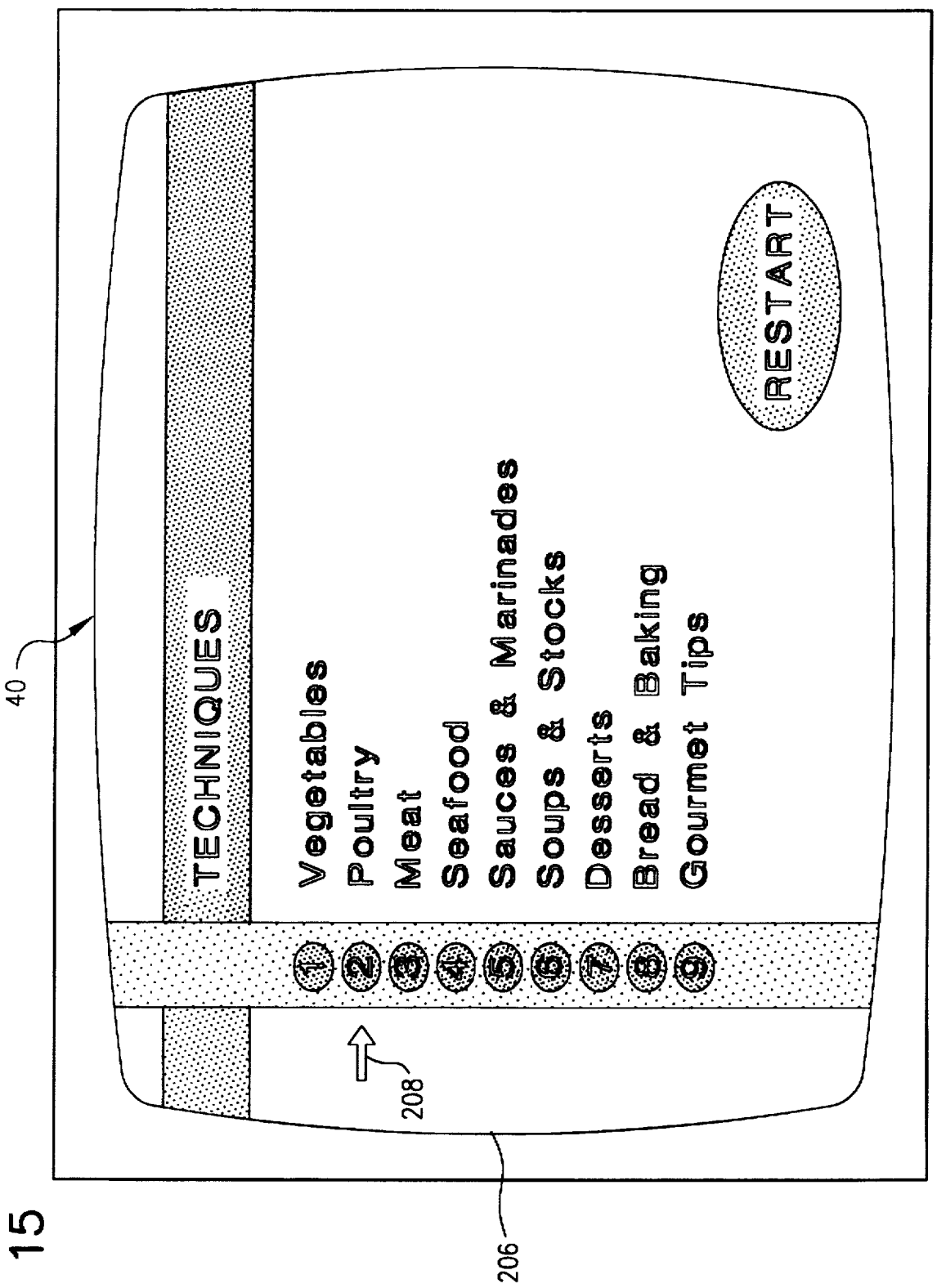

As indicated in FIG. 7, the system user can return at any point, be it a menu or a display of information as shown in FIGS. 11 and 12 to the introductory video 174. This is done by pressing remote control unit RESTART button 180. This ability to jump back to the introductory video by pressing only one button is a significant feature of the invention. It allows the system user at any time to easily and immediately rerun part or all of the introductory video if he or she perceives the need for a refreshed recollection of what is available or how to proceed in order to reach information on a subject of interest.

Another comparable, and equally important, feature of the invention is that the system user can back up one step in the step-by-step information accessing process by pressing a dedicated remote control button 200 labeled BACK. In the example under discussion, for instance, this enables the system user to back up from screen 198 to screen 194, from the latter to third level menu 190, from any menu in the hierarchy to a higher level menu, and from the highest level menu 184 to the introductory video 174. This allows the user to easily and by using only one button review the information presented on screen 40 in a preceding step, to navigate a different path through the available choices, and to return to the introductory video from the top level menu 184.

The arrangement just described is redundant to the extent that the system user can step back from top level menu 184 to introductory video 174 by pressing either BACK button 200 or RESTART button 180. This is purposeful. It eliminates the need for the system user to remember which of these buttons is appropriately pressed to reach the introductory video from the top level menu.

Referring again to the drawing, FIG. 13 is the navigational chart 204 for a second, also representative example of employing remote control 36 to retrieve information from compact disc 32. In this case, the top four levels 176a–176d of menus in a representative five level menu hierarchy are employed; and the information displayed on screen 40 of unit 36 is in the form of an instructional video.

In this representative example, as in every other instance in which the COACH mode of operation is selected with COACH button 172 on remote control 36, the first thing that happens is that introductory video 174 is retrieved from compact disc 32 and played on screen 40. The user can watch part or all of this video, then press FWD button 182 to advance to the top level menu 184 in the hierarchy. In the scenario under discussion, the system user is looking for information on roasting poultry. To reach this information, and as indicated by arrow 205 in FIG. 14, the user elects option two—Techniques—from the top level menu by pressing button ② on remote control numerical keypad 178. This brings up on integrated unit screen 40 a menu 206 labeled TECHNIQUES (see FIG. 15). The nine options in menu 206 include one labeled Poultry. As indicated by arrow 208 in FIG. 15, the user selects this option by again pressing button ② on remote control numerical keypad 178.

Figure 16:
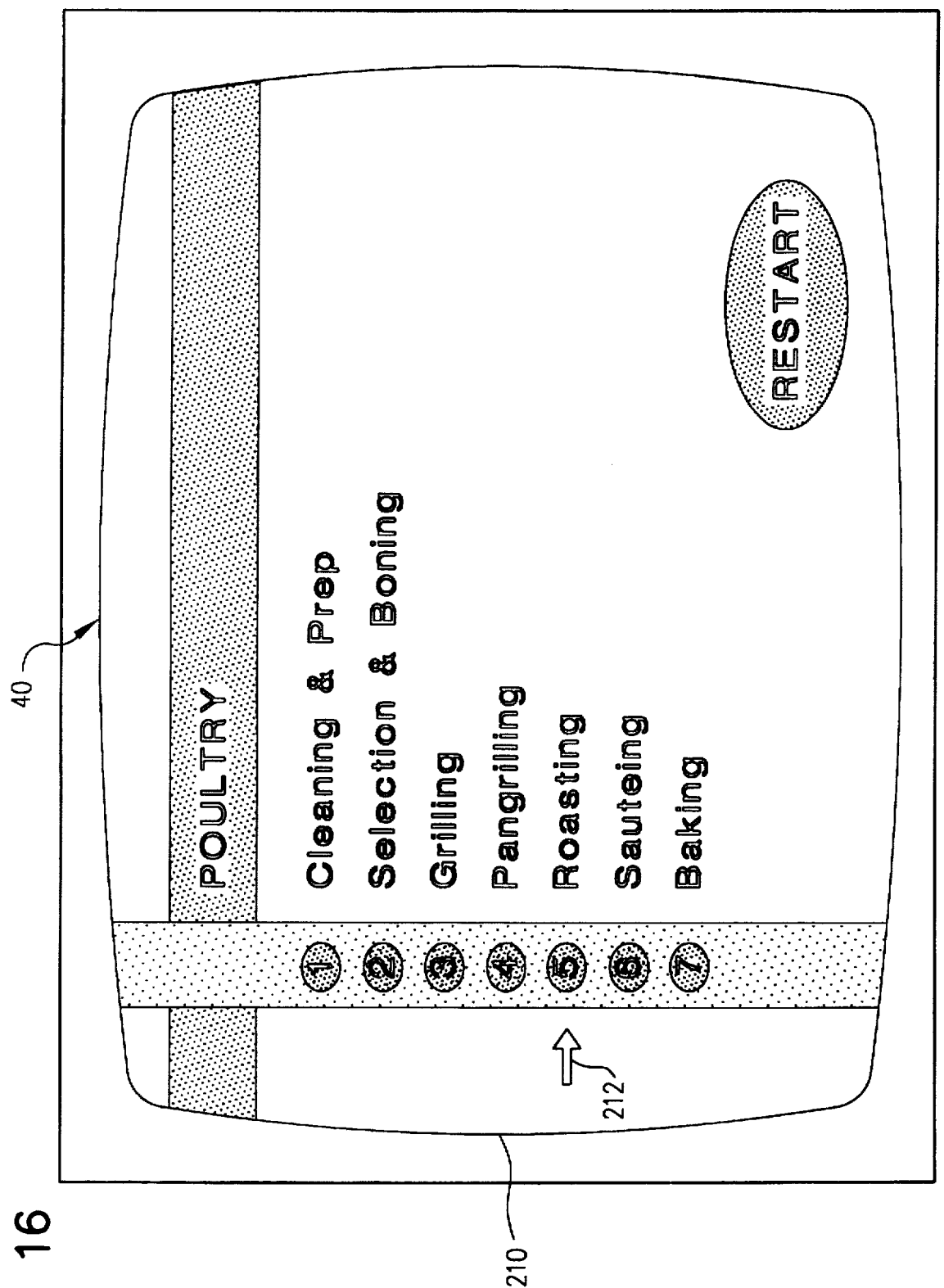
Figure 17:
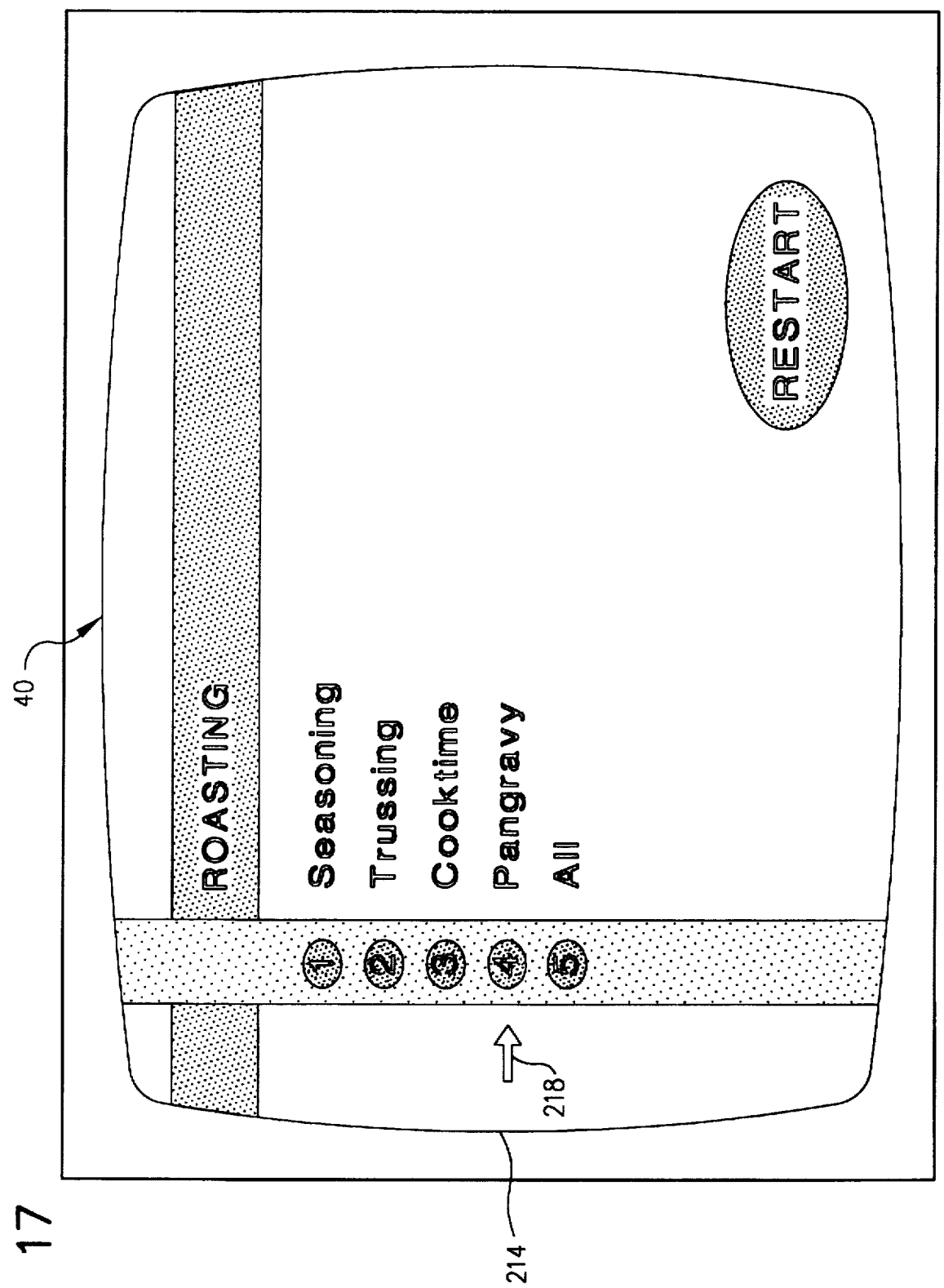
Figure 19:
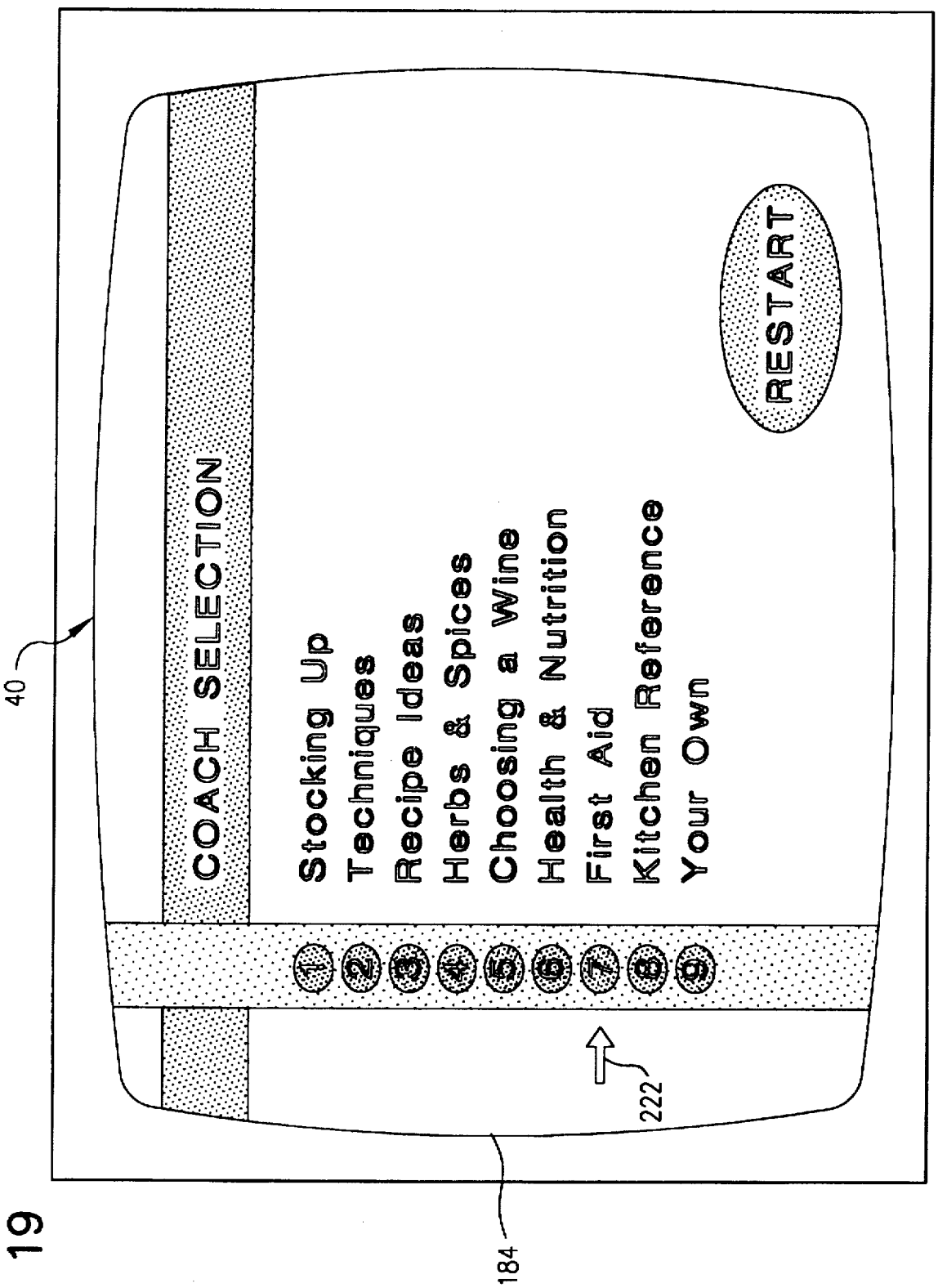
FIGS. 19 and 20 show the two menus presented to one employing the FIG. 20 chart to reach first aid information.
Figure 20:
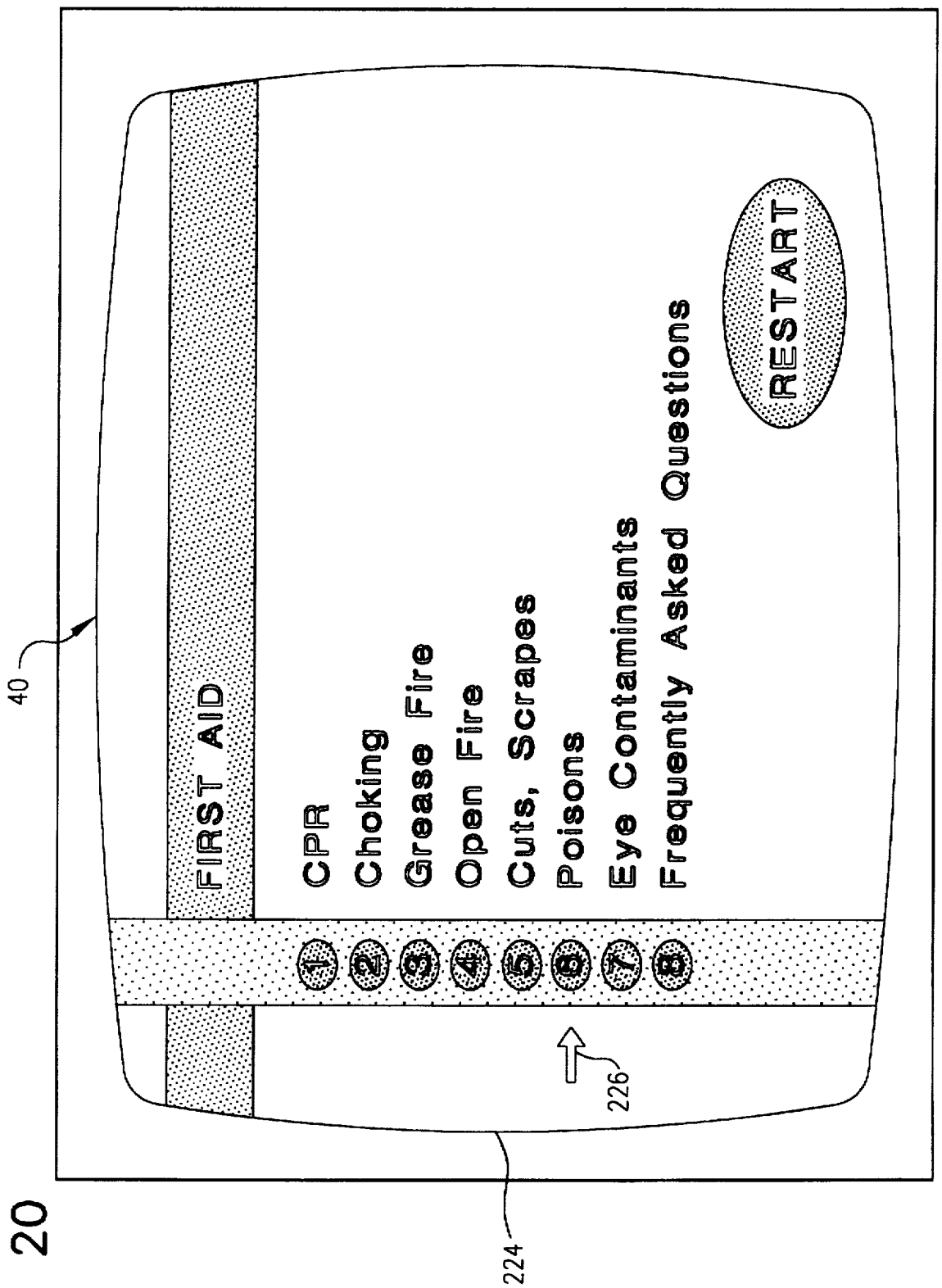

Pressing button ② with menu 206 displayed brings up on screen 40 a third (176c) level menu 210 entitled POULTRY (see FIG. 16). This menu affords the system user seven choices with choice five clearly being the most relevant. As indicated by arrow 212, the system user accordingly presses remote control keypad button ⑤. This brings up on screen 40 a fourth (176d) level menu 214 entitled ROASTING (see FIG. 17). Available from menu 214 is information on seasoning (choice one), trussing (choice two), cooktime (choice three), and pan gravy (choice four) and a fifth choice labeled all. Pressing any of buttons ①, ②, ③, or ④ on remote control numerical keypad 178 will result in an instructional video 216 being retrieved from compact disc 32 and played on integrated unit screen 40. In the current example, the user is looking for information on making gravy. Accordingly, keypad button ④ is pressed as indicated by arrow 218 in FIG. 17; and a video demonstrating how to make gravy from pan juices is played as suggested at 216 in FIG. 13. The corresponding instructional video is played if any of buttons ①, ②, or ③ is pressed. If button ⑤ is pressed, all four videos are played in numerical sequence.

Returning now to FIG. 13, the system user is automatically returned to the fourth (176d) level menu 214 at the end of the selected video or, if choice five is made, after all four videos have been played. From here, or from any other step, the user can return to the preceding step by pressing remote control keypad BACK button 200 or return to introductory video 174 by pressing RESTART button 180.

There are categories of information which the system 30 user needs to retrieve as rapidly as possible, in a minimum number of steps, and with as little attention as possible to the information retrieval process. An important one of these categories is first aid. FIG. 18 is a navigational chart 220 showing how quickly and easily one may retrieve first aid information with a system employing the principles of the present invention.

As in the preceding two examples, it is assumed for purposes of convenience that COACH button 172 has just been pressed and that the system has therefore retrieved and begun to play introductory video 174. Immediately or after watching part or all of introductory video 174, the system user presses remote control FWD button 182 to retrieve and display top level menu 184 on integrated unit screen 40. In this case, FIRST AID information is wanted so the user presses button ⑦ on remote control numerical keypad 178 as shown by arrow 222 in FIG. 19. This retrieves and displays on screen 40 a second (176b) level menu 224 labeled FIRST AID (see FIG. 20).

This example assumes that a victim has swallowed a poisonous material. Consequently, the system user presses button ⑥ on remote control keypad 178 as indicated by arrow 226 in FIG. 20 because choice six from menu 224 is labeled POISONS. This retrieves and plays on integrated unit screen 40 an instructional video 228 (see FIG. 18) on treating victims of poisoning.

It is an important feature of the invention, shown in FIG. 18, that this video is automatically replayed until stopped by pressing remote control RESTART button 180 to return to introductory video 174 or BACK button 200 to back up one step to first aid menu 224. This automatic recycle feature is important because the system user is repeatedly given the appropriate information without any action on the user's part, a decided advantage to one preoccupied with treating a victim in need of immediate attention.

In the preceding examples, it is assumed for the purposes of clarity and brevity that the retrieval of information on the selected subject begins with the pressing of remote control unit COACH button 172 to play introductory video 174. This is of course not required. Instead, a system user can, at any menu level, select a further option to reach information on another subject. For example, the user who has just viewed a video on making pan gravy (FIG. 17) can press remote control unit BACK button 200 to return to the next higher level menu 210 (FIG. 16) above the menu 214 from which the pan gravy video was selected. From here, the user can proceed in a different direction— to retrieve information on baking (menu 210 choice seven), for example, by pressing keypad button ⑦ without returning to the introductory video or even a higher level menu.

The arrows 185, 188, 192, 196, 205, 208, 212, 218, 222, and 226 appearing in FIGS. 8, 9, 10, 11, 14, 15, 16, 17, 19, and 20 have been employed above as a convenience to mark the choices being made from successively lower level menus to reach information on different subjects. It is not required that these arrows actually appear on integrated unit screen 40 as the system user navigates through the information retrieval process.

Referring again to FIG. 4, the system 30 user can at any time and from any step return to the television watching mode of operation of system 30 simply by pressing TV button 230 on remote control 36. When this is done, the COACH mode is "frozen." As a consequence, unless integrated unit 34 is in the interim turned off, the user is returned to the precise point where he or she exited the COACH mode when COACH button 172 is next pressed, be this a point in introductory video 174, the display of a menu, the static display of information, or the display of an instructional or informational video. This unique feature is of an obvious convenience to a user who may wish to interrupt the COACH mode of operation to view part or all of a television program and then return to the task at hand.

Referring still to FIG. 4, the illustrated remote control 36 includes a PAUSE button 231. This button allows the system 30 user to interrupt the playing of introductory video 174 or a video selected from a menu. The video is halted until the system user presses PAUSE button 231 for a second time.

Remote control 36 also has a further array 232 of conventional controls for remote operation of television set 38. This complement includes buttons for changing the channel and volume and for turning off the sound, thus affording complete control over the operation of television set 38 from a remote location. If desired, an additional complement of conventional controls may be provided on remote control 36 so that disc player 42 can also be remotely operated.

It will be appreciated by the reader from the foregoing that an important feature of the present invention is its versatility. The exemplary system 30 described above and depicted in the drawings, for example, can be readied to make available a different set of information for the kitchen or information for a totally different environment—a workshop, a boat, etc.—simply by replacing one video compact disc 32 with another. No setup, initialization, or other steps are required.

The invention may be embodied in many forms without departing from the spirit or essential characteristics of the invention. The present embodiment is therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. An information retrieval and display system which comprises the combination of:

a module comprising a player for a disc with laser readable data stored thereon and a screen for displaying information read from said disc;

a disc as aforesaid operatively associated with said player; and means for controlling the operation of said module in a first, television viewing mode and in a second, information accessing mode and for switching the operation of said module between said television viewing mode and said information accessing mode;

the data stored on said disc corresponding to: (a) a hierarchy of menus, and (b) items of information;

the means for controlling the operation of said disc player being incorporated in a remote control; and said remote control comprising:

a casing;

means in said casing for outputting function-associated signals to a controlled device;

user-manipulatable control means supported in and accessible through openings in said casing for activating the signal outputting means; and means sealing said openings to keep foreign substances from reaching the interior of the casing.

2. A system as defined in claim 1 in which said remote control comprises means for broadcasting coded, radio frequency control signals to the control means in said module.

3. A system as defined in claim 1 in which said control means comprises user-actuatable controls which are accessible from a face of said remote control and wherein said remote control comprises casing means so constructed and configured as to rest on a supporting surface with said remote control face sloping upward from foot to head to make said user-actuatable controls readily visible and accessible to a user.

4. A system as defined in claim 1 in which:

at least one of the menus in said hierarchy offers a user multiple numbered choices;

and said control means comprises an array of user-actuated numbered controls incorporated in said remote control and corresponding on a control-to-one-choice basis with the choices on said menu; and said user actuatable controls being numbered 1 through 9; and the menus in the hierarchy each having a maximum of nine numbered choices.

5. A system as defined in claim 1 in which the casing of said remote control is comprised of two casing components and wherein there is a gasket sealing the gap between said casing components.

6. A system as defined in claim 1 in which said remote control comprises a faceplate affixed to said casing and wherein each of said user-manipulatable means comprises a depressible, protruding segment of said faceplate.

7. A system as defined in claim 6 in which said remote control comprises a switch means and a switch actuator operatively associated with each of said user-manipulatable control means, the switch means being located in the interior of said casing and the actuator extending through an opening in a wall of said casing into an operative relationship with the associated switch means.

8. A system as defined in claim 7 in which said remote control comprises means which keeps foreign material from penetrating to the interior of the casing through the gaps between the switch actuators and those openings in the casing wall through which the switch actuators extend.

9. A system as defined in claim 8 in which said remote control comprises an integral boss depending from said casing wall and surrounding said switch means and a switch support sealed to a lower, exposed edge of said boss to isolate the space in which said switch means are located and defined by said boss and said switch means support from the interior of the remote control casing.

10. A system as defined in claim 1 in which said remote control comprises a faceplate, said faceplate being composed of one or more faceplate segments and each of said faceplate segments having edges trapped in complementary slots which are formed in said casing.

11. A system as defined in claim 1 in which:

said module comprises onboard means for selectively enabling operation of the module in said first, television viewing mode and in the second mode in which said module is enabled for the retrieval and display of information stored in digital form on said disc; and said control means comprises a user-actuatable control which is incorporated in said remote control for causing said onboard means to switch said module between said first and second modes of operation.

12. A system as defined in claim 1 in which:

there is data stored on said disc which corresponds to a step-by-step sequence of instructions for reaching information stored as data on said disc; and said control means comprises a single, dedicated, user-actuatable control which is incorporated in said remote control for returning the operation of the module from all but the first step of the sequence to the previous step.

13. A system as defined in claim 1 in which:

there is data stored on said disc which corresponds to a step-by-step sequence of instructions for reaching information stored as data on said disc; and said control means comprises a single, dedicated, user-actuatable control incorporated in said remote control which, upon actuation at at least one step in the sequence, advances the operation of the module to the next step in the sequence.

14. A system as defined in claim 1 in which:

there is data stored on said disc which corresponds to a step-by-step sequence of instructions for reaching information stored as data on said disc; and said control means comprises a single, dedicated, user-actuatable control which, upon actuation, returns the operation of the control to the initial step in the sequence.

15. An information retrieval and display system which comprises the combination of:

a module comprising a player for a disc with laser readable data stored thereon and a screen for displaying information read from said disc;

a disc as aforesaid operatively associated with said player; and means for controlling the operation of said disc player;

the data stored on said disc corresponding to an introductory video, a hierarchy of menus, and items of information; and said remote control comprising:

a casing;

means in said casing for outputting function-associated signals to a controlled device;

user-manipulatable control means supported in and accessible through openings in said casing for activating the signal outputting means; and means sealing said openings to keep foreign substances from reaching the interior of the casing.

16. A system as defined in claim 15 in which the casing of said remote control is comprised of two casing components and wherein there is a gasket sealing the gap between said casing components.

17. A system as defined in claim 15 which said remote control comprises a faceplate affixed to said casing and wherein each of said user-manipulatable means comprises a depressible, protruding segment of said faceplate.

18. A system as defined in claim 17 which said remote control comprises a switch means and a switch actuator operatively associated with each of said user-manipulatable control means, the switch means being located in the interior of said casing and the actuator extending through an opening in a wall of said casing into an operative relationship with the associated switch means.

19. A system as defined in claim 18 in which said remote control comprises means which keeps foreign material from penetrating to the interior of the casing through the gaps between the switch actuators and those openings in the casing wall through which the switch actuators extend.

20. A system as defined in claim 19 in which said remote control comprises an integral boss depending from said casing wall and surrounding said switch means and a switch support sealed to a lower, exposed edge of said boss to isolate the space in which said switch means are located and defined by said boss and said switch means support from the interior of the remote control casing.

21. A system as defined in claim 15 in which said remote control comprises a faceplate, said faceplate being composed of one or more faceplate segments and each of said faceplate segments having edges trapped in complementary slots which are formed in said casing.

22. A system as defined in claim 15 in which:

at least one of the menus in said hierarchy offers a user multiple numbered choices;

said control means comprises an array of user-actuated numbered controls incorporated in said remote control and corresponding on a control-to-one-choice basis with the choices on said menu;

said actuatable controls are numbered 1 through 9; and the menus in the hierarchy each have a maximum of nine numbered choices.

23. A system as defined in claim 15 in which:

said module comprises onboard means for selectively enabling operation of the module in said first, television viewing mode and in the second mode in which said module is enabled for the retrieval and display of information stored in digital form on said disc; and said control means comprises a user-actuatable control which is incorporated in said remote control for causing said onboard means to switch said module between said first and second modes of operation.

24. A system as defined in claim 15 in which:

there is data stored on said disc which corresponds to a step-by-step sequence of instructions for reaching information stored as data on said disc; and said control means comprises a single, dedicated, user-actuatable control which is incorporated in said remote control for returning the operation of the module from all but the first step of the sequence to the previous step.

25. A system as defined in claim 15 in which:

there is data stored on said disc which corresponds to a step-by-step sequence of instructions for reaching information stored as data on said disc; and said control means comprises a single, dedicated, user-actuatable control incorporated in said remote control which, upon actuation at at least one step in the sequence, advances the operation of the module to the next step in the sequence.

26. A system as defined in claim 15 in which:

there is data stored on said disc which corresponds to a step-by-step sequence of instructions for reaching information stored as data on said disc; and said control means comprises a single, dedicated, user-actuatable control which, upon actuation, returns the operation of the control to the initial step in the sequence.

* * * * *